US010549921B2

(12) United States Patent
Leitzen et al.

(10) Patent No.: US 10,549,921 B2
(45) Date of Patent: Feb. 4, 2020

(54) BEVERAGE CONTAINER BODY DECORATOR INSPECTION APPARATUS

(71) Applicant: Rexam Beverage Can Company, Chicago, IL (US)

(72) Inventors: Douglas Leitzen, Marengo, IL (US); Robert P. Perez, Gurnee, IL (US); James E. Sluis, III, Oak Forest, IL (US); Thomas Kitowski, Antioch, IL (US); Eric D. Baune, Algonquin, IL (US)

(73) Assignee: REXAM BEVERAGE CAN COMPANY, Chicago, IL (US)

( * ) Notice: Subject to any disclaimer, the term of this patent is extended or adjusted under 35 U.S.C. 154(b) by 620 days.

(21) Appl. No.: 15/159,060

(22) Filed: May 19, 2016

(65) Prior Publication Data

US 2017/0334659 A1    Nov. 23, 2017

(51) Int. Cl.
   *B65G 43/10*        (2006.01)
(52) U.S. Cl.
   CPC ...... *B65G 43/10* (2013.01); *B65G 2201/0252* (2013.01); *B65G 2203/0216* (2013.01); *B65G 2203/041* (2013.01)
(58) Field of Classification Search
   None
   See application file for complete search history.

(56) References Cited

U.S. PATENT DOCUMENTS

| | | | |
|---|---|---|---|
| 3,098,564 A | 7/1963 | Fouse et al. | |
| 3,252,410 A | 5/1966 | Stephenson | |
| 3,262,460 A | 7/1966 | Huddle et al. | |
| 3,286,302 A | 11/1966 | Doering | |
| 3,313,409 A | 4/1967 | Johson | |
| 3,504,390 A | 5/1968 | Wing | |
| 3,357,950 A | 1/1971 | Powers | |

(Continued)

FOREIGN PATENT DOCUMENTS

| CA | 2097619 | 5/1992 |
|---|---|---|
| CH | 654524 | 2/1986 |

(Continued)

OTHER PUBLICATIONS

The International Search Report and Written Opinion for corresponding PCT/US2017/033527 dated Oct. 19, 2017 (16 pages).

(Continued)

*Primary Examiner* — William C Vaughn, Jr.
*Assistant Examiner* — Joseph Daniel A Towe
(74) *Attorney, Agent, or Firm* — Greer, Burns & Crain, Ltd.

(57) ABSTRACT

A metallic beverage container body inspection apparatus processes a plurality of metallic beverage container bodies along an index path. An indexer sequentially transfers metallic beverage container bodies from the manufacturing queue through the apparatus while maintaining an orientation of the container bodies. A dwell position is located on the index path wherein the indexer delivers metallic beverage container bodies to the dwell position. An inspection position is vertically aligned with and horizontally offset from the dwell position. An image recorder is aimed the inspection position and captures a plurality of images about a circumference of each metallic beverage containers.

19 Claims, 13 Drawing Sheets

(56) References Cited

U.S. PATENT DOCUMENTS

| | | |
|---|---|---|
| 3,752,073 A | 8/1973 | Lorber |
| 3,766,851 A | 10/1973 | Sirvet et al. |
| 3,782,542 A | 1/1974 | Scribner |
| 3,923,158 A | 12/1975 | Fornaa |
| 3,952,698 A | 4/1976 | Beyer et al. |
| 3,983,729 A | 10/1976 | Traczyk et al. |
| 3,991,673 A | 11/1976 | Coale et al. |
| 4,048,917 A | 9/1977 | Skrypek et al. |
| 4,105,122 A | 8/1978 | Flood et al. |
| 4,132,826 A | 1/1979 | Dessauer et al. |
| 4,142,462 A | 3/1979 | Gilore |
| 4,319,930 A | 3/1982 | Yano et al. |
| 4,327,756 A | 5/1982 | Rath |
| 4,374,681 A | 2/1983 | Schueneman |
| 4,378,493 A | 3/1983 | Dorf et al. |
| 4,384,518 A | 5/1983 | Albin |
| 4,395,946 A | 8/1983 | Price |
| 4,399,357 A | 8/1983 | Dort et al. |
| 4,442,934 A | 4/1984 | Dort et al. |
| 4,471,011 A | 9/1984 | Sporing |
| 4,479,429 A | 10/1984 | Haryu |
| 4,492,476 A | 1/1985 | Miyazawa |
| 4,519,232 A | 5/1985 | Traczyk et al. |
| 4,519,310 A | 5/1985 | Shimizu et al. |
| 4,589,339 A | 5/1986 | Fischer |
| 4,616,306 A | 10/1986 | Kuzma et al. |
| 4,620,090 A | 10/1986 | Ducloux |
| 4,732,027 A | 3/1988 | Traczyck et al. |
| 4,741,266 A | 5/1988 | Stirbis et al. |
| 4,774,839 A | 10/1988 | Caleffi et al. |
| 4,790,662 A | 12/1988 | Bischkopf et al. |
| 4,872,024 A | 10/1989 | Nagai et al. |
| 4,884,504 A | 12/1989 | Sillars |
| 4,889,560 A | 12/1989 | Jaeger et al. |
| 4,898,752 A | 2/1990 | Cavagna et al. |
| 4,903,599 A | 2/1990 | Kulber et al. |
| 4,924,083 A | 5/1990 | Ishikawa et al. |
| 4,924,107 A | 5/1990 | Tucker |
| 5,010,814 A | 4/1991 | Shishikura |
| 5,017,795 A | 5/1991 | Dower et al. |
| 5,049,432 A | 9/1991 | Ooms et al. |
| 5,065,905 A | 11/1991 | Eddy et al. |
| 5,120,126 A | 6/1992 | Wertz et al. |
| 5,181,471 A | 1/1993 | Sillars |
| 5,213,043 A | 5/1993 | Reimers et al. |
| 5,282,306 A | 2/1994 | Katsuhiro |
| 5,335,682 A | 8/1994 | Yoshimura et al. |
| 5,337,659 A | 8/1994 | Whelan |
| 5,339,731 A | 8/1994 | Howard et al. |
| 5,351,617 A | 8/1994 | Williams et al. |
| 5,353,703 A | 10/1994 | Rieker |
| 5,356,481 A | 10/1994 | Yoshimura et al. |
| 5,385,092 A | 1/1995 | Lewis et al. |
| 5,469,787 A | 11/1995 | Turner et al. |
| 5,497,900 A | 3/1996 | Caleffi et al. |
| 5,502,476 A | 3/1996 | Neal et al. |
| 5,591,255 A | 1/1997 | Small et al. |
| 5,591,462 A | 1/1997 | Darling et al. |
| 5,713,288 A | 2/1998 | Frazzitta |
| 5,771,798 A | 6/1998 | Shriver |
| 5,806,427 A | 9/1998 | Niemiro et al. |
| 5,908,505 A | 6/1999 | Bargenquest et al. |
| 5,919,839 A | 7/1999 | Titterington et al. |
| 5,970,865 A | 10/1999 | Horth et al. |
| 5,974,974 A | 11/1999 | Agnew et al. |
| 5,987,161 A | 11/1999 | Doane et al. |
| 6,037,101 A | 3/2000 | Telser et al. |
| 6,058,839 A | 5/2000 | Frazzitta |
| 6,079,326 A | 6/2000 | Strutz et al. |
| 6,139,779 A | 10/2000 | Small et al. |
| 6,174,937 B1 | 1/2001 | Banning et al. |
| 6,184,988 B1 | 2/2001 | Ferrari |
| 6,196,675 B1 | 3/2001 | Deily et al. |
| 6,238,837 B1 | 5/2001 | Fan |
| 6,309,453 B1 | 10/2001 | Banning et al. |
| 6,312,872 B1 | 11/2001 | Murphy |
| 6,395,123 B1 | 5/2002 | Fromson et al. |
| 6,473,169 B1 | 10/2002 | Dawley et al. |
| 6,494,950 B1 | 12/2002 | Fujita et al. |
| 6,494,961 B2 | 12/2002 | Simpson |
| 6,525,333 B1 | 2/2003 | Dawley et al. |
| 6,543,350 B2 | 4/2003 | Gilliam et al. |
| 6,550,389 B1 | 4/2003 | Goto et al. |
| 6,551,422 B1 | 4/2003 | O'Connor |
| 6,553,907 B2 | 4/2003 | Richards |
| 6,584,895 B1 | 7/2003 | Dawley et al. |
| 6,594,927 B2 | 7/2003 | Witkowski |
| 6,640,713 B2 | 11/2003 | Landsman |
| 6,651,559 B2 | 11/2003 | Haraux et al. |
| 6,755,202 B1 | 6/2004 | Scholey et al. |
| 6,779,445 B2 | 8/2004 | Schaede |
| 6,779,455 B2 | 8/2004 | Figov et al. |
| 6,827,019 B1 | 12/2004 | Strauch et al. |
| 6,899,998 B2 | 5/2005 | Figov |
| 6,920,822 B2 | 7/2005 | Finan |
| 6,989,226 B2 | 1/2006 | Hieronymus et al. |
| 7,227,166 B2 | 6/2007 | Cochran et al. |
| 7,308,142 B2 | 12/2007 | Sones et al. |
| 7,309,563 B2 | 12/2007 | Paul et al. |
| 7,313,270 B2 | 12/2007 | Sones |
| 7,394,937 B2 | 7/2008 | Sones |
| 7,399,526 B2 | 7/2008 | Sones |
| 7,464,642 B2 | 12/2008 | Schaede |
| 7,488,965 B2 | 2/2009 | Cochran et al. |
| 7,667,836 B2 | 2/2010 | Sones et al. |
| 7,684,034 B2 | 3/2010 | Sones et al. |
| 7,691,549 B1 | 4/2010 | Glasser |
| 7,773,214 B2 | 8/2010 | Sones et al. |
| 7,810,922 B2 | 10/2010 | Gervasi et al. |
| 7,821,629 B2 | 10/2010 | Akkerman et al. |
| 7,997,199 B2 | 8/2011 | Watanabe et al. |
| 42,715 A1 | 9/2011 | Sones |
| 8,014,586 B2 | 9/2011 | Sones et al. |
| 8,034,207 B2 | 10/2011 | Hunahata |
| 8,409,698 B2 | 4/2013 | Byers et al. |
| 8,544,385 B2 | 10/2013 | Schuler-Cossette et al. |
| 8,574,492 B2 | 11/2013 | Morita et al. |
| 9,409,433 B2 | 8/2016 | Carreras |
| 9,475,276 B2 | 10/2016 | Fleischer et al. |
| 9,555,616 B2 | 1/2017 | Carreras et al. |
| 9,962,978 B2 | 5/2018 | Izume |
| 2002/0083855 A1 | 4/2002 | Samworth |
| 2002/0148485 A1 | 10/2002 | Taft et al. |
| 2002/0178945 A1 | 12/2002 | Richards |
| 2002/0189471 A1 | 12/2002 | Juffinger et al. |
| 2003/0015105 A1 | 1/2003 | Dewig |
| 2003/0024554 A1 | 2/2003 | Schultz et al. |
| 2003/0056410 A1 | 3/2003 | Witkowski |
| 2003/0089261 A1 | 5/2003 | Landsman |
| 2003/0101885 A1 | 6/2003 | Jordan |
| 2003/0150346 A1 | 8/2003 | Haraux et al. |
| 2003/0179920 A1 | 9/2003 | Hooker et al. |
| 2004/0011234 A1 | 1/2004 | Figov et al. |
| 2004/0126682 A1 | 7/2004 | Dreher et al. |
| 2004/0173110 A1 | 9/2004 | Roesch |
| 2004/0191693 A1 | 9/2004 | Takamiya |
| 2004/0211446 A1 | 10/2004 | Schultz et al. |
| 2005/0098051 A1 | 5/2005 | Flint et al. |
| 2006/0019196 A1 | 1/2006 | Miyoshi |
| 2006/0121389 A1 | 6/2006 | Anzures et al. |
| 2006/0137548 A1 | 6/2006 | Vetter |
| 2007/0084368 A1 | 4/2007 | Vest et al. |
| 2007/0289905 A1 | 12/2007 | Sondag |
| 2008/0002182 A1 | 1/2008 | Akkerman et al. |
| 2009/0106958 A1 | 4/2009 | Lanz et al. |
| 2009/0303307 A1 | 12/2009 | Yasumatsu |
| 2010/0031834 A1 | 2/2010 | Morgavi et al. |
| 2010/0229737 A1 | 9/2010 | Ouchi |
| 2010/0295885 A1 | 11/2010 | LaCaze |
| 2010/0319555 A1 | 12/2010 | Hashimoto et al. |
| 2011/0079158 A1 | 4/2011 | Recchia et al. |
| 2011/0104615 A1 | 5/2011 | Sievers |
| 2011/0126760 A1 | 6/2011 | Daems et al. |
| 2011/0140010 A1 | 6/2011 | Akkerman et al. |

(56) References Cited

U.S. PATENT DOCUMENTS

| | | | |
|---|---|---|---|
| 2011/0162542 A1 | 7/2011 | Nakamura et al. | |
| 2011/0197923 A1 | 8/2011 | Battaglioli et al. | |
| 2011/0255134 A1 | 10/2011 | Shigeta et al. | |
| 2011/0283905 A1 | 11/2011 | Sakata | |
| 2012/0048135 A1 | 3/2012 | Burberry et al. | |
| 2012/0103216 A1 | 5/2012 | Knisel et al. | |
| 2012/0204746 A1 | 8/2012 | Fullgraf | |
| 2012/0216689 A1 | 8/2012 | Cochran et al. | |
| 2012/0238675 A1 | 9/2012 | Kataura et al. | |
| 2012/0274695 A1 | 11/2012 | LaCaze et al. | |
| 2012/0315412 A1 | 12/2012 | Clayton et al. | |
| 2013/0019566 A1 | 1/2013 | Schach | |
| 2013/0020739 A1 | 1/2013 | Yamashita | |
| 2013/0075675 A1 | 3/2013 | Krutak et al. | |
| 2013/0105743 A1 | 5/2013 | Owen et al. | |
| 2013/0176358 A1 | 7/2013 | Yamada et al. | |
| 2013/0208105 A1 | 8/2013 | Schmidt et al. | |
| 2013/0213250 A1 | 8/2013 | Fuellgraf et al. | |
| 2013/0228086 A1 | 9/2013 | Baldwin et al. | |
| 2013/0231242 A1 | 9/2013 | Clayton et al. | |
| 2013/0242276 A1 | 9/2013 | Schadebrodt et al. | |
| 2013/0340885 A1 | 12/2013 | Clayton et al. | |
| 2014/0039091 A1 | 2/2014 | Owen et al. | |
| 2014/0072442 A1 | 3/2014 | Bowman et al. | |
| 2014/0187668 A1 | 7/2014 | Owen et al. | |
| 2014/0210201 A1 | 7/2014 | Owen et al. | |
| 2014/0212654 A1 | 7/2014 | Clayton et al. | |
| 2014/0253718 A1* | 9/2014 | Leitzen | B21D 51/263 348/92 |
| 2014/0272161 A1 | 9/2014 | Clayton et al. | |
| 2015/0035970 A1 | 2/2015 | Brumbaugh et al. | |
| 2015/0138295 A1 | 5/2015 | Lindner et al. | |
| 2015/0174891 A1 | 6/2015 | Boas et al. | |
| 2015/0183211 A1 | 7/2015 | Petti et al. | |
| 2015/0290923 A1 | 10/2015 | Treloar | |
| 2016/0001546 A1 | 1/2016 | Hughes et al. | |
| 2016/0129687 A1 | 5/2016 | Boas et al. | |
| 2016/0347048 A1 | 12/2016 | Carreras | |
| 2017/0013452 A1 | 4/2017 | Boas et al. | |
| 2017/0157964 A1* | 6/2017 | Izume | B41F 17/22 |
| 2017/0334659 A1 | 11/2017 | Leitzen et al. | |
| 2018/0009216 A1 | 1/2018 | Egerton et al. | |
| 2018/0009217 A1 | 1/2018 | Henrik | |

FOREIGN PATENT DOCUMENTS

| | | | |
|---|---|---|---|
| CN | 101808825 | 8/2010 | |
| CN | 102143846 | 8/2011 | |
| CN | 103109233 | 5/2013 | |
| DE | 19807924 | 8/1998 | |
| DE | 20 2004 007 783 U1 | 5/2004 | |
| DE | 102006025897 | 1/2007 | |
| EP | 202928 | 11/1986 | |
| EP | 317987 | 5/1989 | |
| EP | 545862 | 6/1993 | |
| EP | 0646148 | 3/1995 | |
| EP | 0717320 | 6/1996 | |
| EP | 1262316 | 12/2002 | |
| EP | 1630600 | 3/2006 | |
| EP | 2153991 | 2/2010 | |
| EP | 2196314 | 6/2010 | |
| EP | 2317387 | 5/2011 | |
| EP | 2384890 | 11/2011 | |
| EP | 2842747 | 3/2015 | |
| EP | 3175987 A1 | 6/2017 | |
| GB | 1298205 | 11/1972 | |
| GB | 2097331 | 11/1982 | |
| GB | 2512678 | 10/2014 | |
| JP | S58-49256 | 3/1983 | |
| JP | 09210924 | 8/1997 | |
| JP | H09-295396 | 11/1997 | |
| JP | 2000121580 | 4/2000 | |
| JP | 2000-258899 | 9/2000 | |
| JP | 2001/030612 | 2/2001 | |
| JP | 2002156338 | 5/2002 | |
| JP | 2007/076209 | 3/2007 | |
| JP | 2007-185917 | 7/2007 | |
| JP | 2007-223106 | 9/2007 | |
| JP | 2007-245449 | 9/2007 | |
| JP | 2008249668 | 10/2008 | |
| JP | 2009-241312 | 10/2009 | |
| JP | 2010-036518 | 2/2010 | |
| JP | 2010-064450 | 3/2010 | |
| JP | 2010-069836 | 4/2010 | |
| JP | 2010249541 | 11/2010 | |
| KR | 10-2006-0004679 | 1/2006 | |
| WO | 1990/02044 | 3/1990 | |
| WO | 94/07693 | 4/1994 | |
| WO | 96/41299 | 12/1996 | |
| WO | 98/17474 | 4/1998 | |
| WO | 98/41966 | 9/1998 | |
| WO | 00/27644 | 5/2000 | |
| WO | 01/12440 | 2/2001 | |
| WO | 2004069539 | 8/2004 | |
| WO | 2005047011 | 5/2005 | |
| WO | 2006/048022 | 5/2006 | |
| WO | 2008/092940 | 8/2008 | |
| WO | 2009/090389 | 7/2009 | |
| WO | 2012054655 A1 | 4/2012 | |
| WO | WO-2012054655 A1 * | 4/2012 | B41F 17/22 |
| WO | 2012148576 | 11/2012 | |
| WO | 2013/028804 | 2/2013 | |
| WO | 2013/115800 | 8/2013 | |
| WO | 2013113616 | 8/2013 | |
| WO | 2013/155423 | 10/2013 | |
| WO | 2014/008544 | 1/2014 | |
| WO | 2014006517 | 1/2014 | |
| WO | 2014/096088 | 6/2014 | |
| WO | 2014108489 | 7/2014 | |
| WO | 2014128200 | 8/2014 | |
| WO | 2014/144853 | 9/2014 | |
| WO | 2015/046119 A1 | 9/2014 | |
| WO | 2014/164796 A2 | 10/2014 | |
| WO | 2015101828 | 7/2015 | |
| WO | 2016/183452 | 11/2016 | |
| WO | 2018013465 A1 | 1/2018 | |

OTHER PUBLICATIONS

Traczyk et al., B 546,631 Published U.S. Patent Application under the Second Trial Voluntary Protest Program (938 O. G. 945, Sep. 16, 1975), publication date of Feb. 3, 1976.

European Patent Office, International Search Report, dated Oct. 1, 2014 for corresponding PCT Application No. PCT/US2014/023502, Applicant Rexam Beverage Can Company.

"Blanket for Offset Printing," Offset printing technology, 2016, 4 pages [retrieved from: www.offsetprintingtechnology.com.sub-categories/blanket-for-offset-printing/].

Bowell et al., "Advancing Flexography: The Technical Path Forward," DuPont, 2011, retrieved from www2.dupont.com/packaging_graphics/en_us/assets/downloads/pdf/advflexo_brochure.pdf, 12 pages.

"Chemical Milling," Wikipedia, Feb. 13, 2015, retrieved from http://en.wikipedia.org/wiki/chemical_milling, 6 pages.

"Cyrel® DSP High Performance Plate," DuPont, 2016, 2 pages [retrieved online from: www.dupont.com/products-and-services/printing-package-printing/flexographic-platemaking-systems/brands/cyrel/products/sub-products/cyrel-dsp.html].

Corrected Notice of Allowance for U.S. Appl. No. 14/686,517, dated Sep. 28, 2016 6 pages.

"Dry Offset Printing," Encyclopedia Britannica, 2016, 2 pages [retrieved online from: www.britannica.com/technology/dry-offset].

"DuPont™ Cyrel®: CyrelTM Digital flex plate Imagers (CDI)" DuPont, 2009, retrieved from http://www2.dupont.com/packaging_graphics/en_gb/assets/downloads/pdf/CDI_family_english.pdf, 8 pages.

"DuPont™ Cyrel® DPR: Robust Digital Plate for Highest Quality Printing," DuPont 2010, retrieved from http://www2.dupont.com/packaging_graphics/en_us/assets/downloads/pdf/DP_Cyrel_DS_DPR_us_low.pdf., 2 pages.

"DuPont™ Cyrel® NOWS: Rugged, High-Performance Analog

(56) References Cited

OTHER PUBLICATIONS

Plate," DuPont, 2007, retrieved from http:www2.dupont.com/packaging_graphics/en_us/assests/downloads/pdf/Cyrel_NOWS.pdf, 2 pages.
"EPDM Rubber," Wikipedia, Oct. 24, 2014, retrieved from http://enwikipedia.org/wiki/EPDM_rubber, 3 pages.
Extended Search Report for European Patent Application No. 14810948.1, dated Apr. 11, 2017 10 pages.
"Flexographic Ink," Wikipedia, Sep. 18, 2014, retrieved from http://en.wikipedia.org/wiki/flexographic_ink, 2 pages.
"Flexography," Wikipedia, Dec. 15, 2014, retrieved from http://en.wikipedia.org/wiki/flexorgraphic, 6 pages.
International Preliminary Report on Patentability for International (PCT) Patent Application No. PCT/US2014/041713, dated Dec. 15, 2015 6 pages.
International Preliminary Report on Patentability for International (PCT) Patent Application No. PCT/US2016/027576, dated Jul. 22, 2016 6 pages.
International Search Report and Written Opinion for International (PCT) Patent Application No. PCT/US16/27576, dated Jul. 22, 2016 5 pages.
International Search Report and Written Opinion for International (PCT) Patent Application No. PCT/US14/41713, dated Oct. 10, 2014 8 pages.
"Laser Engraving," Wikipedia, Jan. 16, 2015, retrieved from http://en.wikipedia.org/wiki/laser_engraving, 10 pages.
"Luminous Paint," Wikipedia, Jul. 7, 2014, retrieved from http://en.wikipedia.org/wiki/luminous_paint, 4 pages.
Mine, "How Offset Printing Works," retrieved on Feb. 9, 2015 from www.howstuffworks.com/offset-printing.htm/printable, 5 pages.
Notice of Allowance for U.S. Appl. No. 14/301,018, dated Apr. 6, 2016 10 pages.
Notice of Allowance for U.S. Appl. No. 15/231,128, dated Jan. 5, 2018 8 pages.
Notice of Allowance for U.S. Appl. No. 14/686,517, dated Sep. 13, 2016 9 pages.
Official Action for U.S. Appl. No. 14/301,018, dated Aug. 14, 2015 10 pages.
Official Action for U.S. Appl. No. 14/005,873, dated Aug. 26, 2015, 27 pages.
Official Action for U.S. Appl. No. 14/301,018, dated Dec. 15, 2015 8 pages.
Official Action for U.S. Appl. No. 14/686,517, dated Jan. 15, 2016 8 pages.
Official Action for U.S. Appl. No. 15/231,128, dated Jul. 13, 2017 8 pages.
Official Action for U.S. Appl. No. 14/686,517, dated Jul. 6, 2016 9 pages.
Official Action for U.S. Appl. No. 14/301,018, dated May 13, 2015 5 pages.
Official Action for U.S. Appl. No. 14/686,517, dated Oct. 15, 2015 5 pages Restriction Requirement.
"Offset Lithography," PrintWiki, retrieved Feb. 9, 2015 from http://printwiki.org/offset_lithography, 8 pages.
"Offset Printing," Wikipedia, Dec. 11, 2014, retrieved from http://en.wikipedia.org/wiki/offset_printing, 12 pages.
"Offset Printing," Offset Printing Technology, 2016, 4 pages [retrieved online from: www.offsetprintingtechnology.com].
"Offset Printing," BusinessDictionary.com, 2015, 2 pages [retrieved online from: www.businessdictionary.com/definition/offset-printing.html].
"Offset Printing/Dry Offset," Buse Printing & Packaging, 2016, 1 page [retrieved online from: buseprinting.com/offset printing.html].
"Plate," PrintWiki, retrieved Feb. 9, 2015 from http://printwiki.org/Plate, 6 pages.
"Printmaking," Wikipedia, Feb. 12, 2015, retrieved from http://en.wikipedia.org/wiki/printmaking, 14 pages.
Third Party Observations for European Patent Application No. 14810948.1, dated Jan. 29, 2018 5 pages.
Third Party Observations for European Patent Application No. 14810948.1, dated Dec. 21, 2016 5 pages.
"What is Offset Printing (Offset Lithography)?"TechTarget, 2016, 13 pages [retrieved online from: whatis.techtarget.com/definition/offset-printing-offset-lithography].
Candian Examination Report for corresponding Canadian Patent Application No. 3023936 dated Jul. 23, 2019.
Russian Search Report for corresponding Russian Patent Application No. 2018142419.

\* cited by examiner

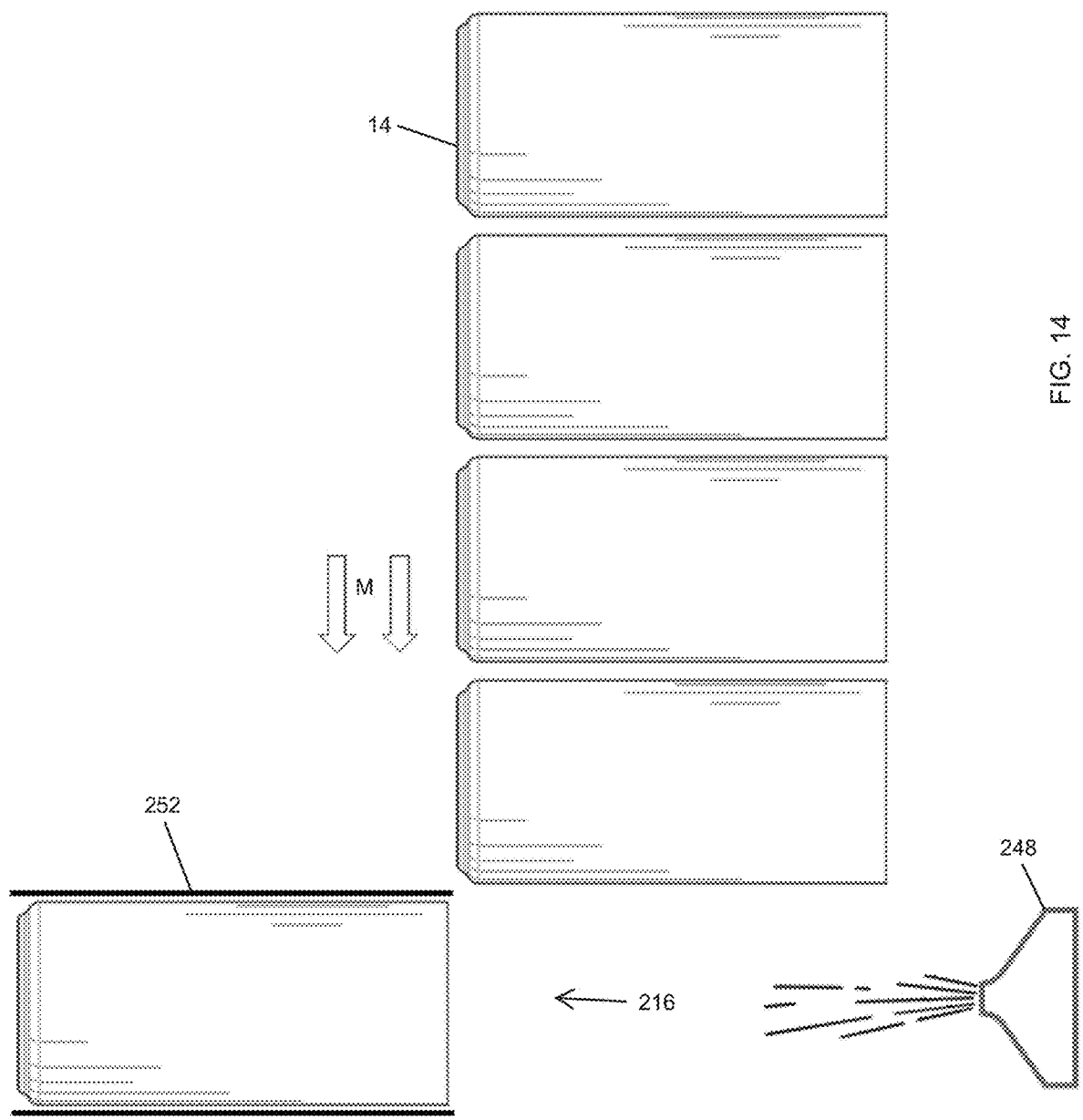

BEVERAGE CONTAINER BODY DECORATOR INSPECTION APPARATUS

CROSS-REFERENCE TO RELATED APPLICATIONS

N/A

FEDERALLY SPONSORED RESEARCH OR DEVELOPMENT

N/A

TECHNICAL FIELD

The invention relates to beverage can decorators; more particularly, the present invention relates to inspecting beverage container bodies subsequent to decorating the container bodies on a dry rotary offset beverage container body decorator.

BACKGROUND

Recent developments in metallic beverage container body decorating allow manufacturers to produce consecutively decorated beverage container bodies having unique finished art relative to each other on a single dry offset beverage container body decorator. Prior to these recent developments, consecutively decorated beverage container bodies exhibited identical finished art. Some of these recent developments are disclosed in U.S. Patent Application Publication No. 2015/0174891 A1 corresponding to U.S. application Ser. No. 14/412,585, which is hereby incorporated by reference as if fully set for herein and for a particular purpose of describing the dry rotary offset printing process as it relates to metallic beverage container bodies for two-piece beverage containers.

In a typical dry rotary offset beverage container body decorator, cartridges are supplied with colored ink that is eventually applied onto a cylindrical side wall of the metal beverage container body. The printing apparatus is provided with an ink cartridge for each color that one wishes to apply onto the metal beverage container body.

The ink cartridges supply ink to printing plates, which have art in relief corresponding to finished art to be printed onto the metal beverage container. This finished art may be a text, a figure, or any type of graphic which one wishes to make on a metal beverage container. Thus, it is very important to position the printing plate correctly relative to the metal beverage container and the ink cartridges.

It is also important to note that the relief art present on the printing plates is in high relief wherein ink supplied to the art in high relief on the printing plates transfers to a transfer blanket. This transfer blanket is an ink transferring means between the printing plates and the metal beverage container to be printed, generally produced from a rubber, rubber-like, or other pliable material.

The ink-laden relief features on each printing plate come into contact with a single transfer blanket. Thus, each transfer blanket receives ink from a plurality of printing plates to produce a finished artwork design. This is carried out by rotation of a printing plate, which transfers the ink present in relief to the transfer blanket, which is fixed on a transfer blanket drum, which has a rotation synchronized with (i) the metal beverage container bodies to be printed, (ii) the positioning of the transfer blankets that are on the surface of the transfer blanket drum, and (iii) the printing plates.

Each beverage container body engages just one transfer blanket to receive a complete finished art design of multiple colors that the transfer blanket has received from a plurality of printing plates.

The synchronization between aforementioned elements makes it possible to decorate the metal beverage container bodies in a precise manner. This is of the utmost importance in metal beverage container printing. There should be no overlapping of the print on the metal beverage container when it receives ink corresponding to the art exhibited by the plurality of printing plates from a single transfer blanket.

In other words, the art on a first printing plate will transfer ink only to a predetermined area of a first transfer blanket. A second printing plate will transfer ink on its surface to another area on the first transfer blanket that did not receive ink from the first printing plate, and so on. This is dependent on the number of printing colors on the metal beverage containers.

Thus, printing of an entire metal beverage container cylindrical surface without ink overlapping is possible using this type of rotary dry offset printing apparatus. In this regard, it should be stressed that there is transfer of more than one art, each having a different color to a single transfer blanket on the transfer blanket drum from more than one printing plate, each in communication with a respective ink-cartridge. Upon continuous rotation of the transfer blanket drum, the blanket comes into contact with the metal beverage container cylindrical surface to be printed. Thus, each blanket fully decorates one metal beverage container body upon rotation of the drum.

The recent improvement in beverage container body decorating includes providing art in the form of relief features on the transfer blankets. Thus, rather than having a single flat surface that receives ink from the printing plates, each transfer blankets has art in relief, typically low relief engravings or cooperating regions in high and low relief, to produce differing final images on consecutively decorated metallic beverage container bodies on a dry offset rotary beverage container body decorator.

Because the transfer blankets are produced from a softer material, such as rubber or a material having a cushioning elastic-like quality, the decorating process can result in print anomalies or defects associated with transfer blanket physical properties, difficulties in registration between the printing blankets or the container bodies, and simple wear and tear. There exists, therefore, a need to inspect decorated beverage container bodies as soon as practicable in the container body manufacturing process. The problem addressed by the inventors can be stated as follows: How to inspect metallic beverage container bodies during a beverage container body manufacturing process as soon after the container bodies have been decorated.

The present invention is provided to solve the problems discussed above and other problems, and to provide advantages and aspects not provided by prior beverage container body manufacturing processes of this type. A full discussion of the features and advantages of the present invention is deferred to the following detailed description, which proceeds with reference to the accompanying drawings.

SUMMARY

A first aspect of the invention is an apparatus for inspecting a metallic beverage container body comprising an index path wherein a fraction, or subset, of a plurality of metallic beverage container bodies in a manufacturing queue is diverted from the manufacturing queue to the index path; an indexer which sequentially transfers metallic beverage container bodies along the index path, the indexer having a plurality of container body pockets which maintain the metallic beverage container bodies in a predetermined orientation; a dwell position in operative alignment with the index path wherein the indexer delivers metallic beverage container bodies to the dwell position; an inspection position vertically aligned with and horizontally offset from the dwell position; an image recorder aimed the inspection position for capturing a plurality of images about a circumference of each of the fraction of metallic beverage containers as each of the fraction of metallic beverage containers completes at least one full rotation about a generally horizontal axis. An aspect of the invention is one, any, or all of the prior aspects in this paragraph up through the first aspect in this paragraph further comprising a mandrel having a generally cylindrical side wall separating a distal end of the mandrel from a proximal end of the mandrel wherein the mandrel is insertable within the metallic beverage container bodies such that the distal end is positioned adjacent an enclosed bottom of the metallic beverage containers and the proximal end is positioned adjacent an open end of the metallic beverage container bodies. An aspect of the invention is one, any, or all of the prior aspects in this paragraph up through the first aspect in this paragraph wherein the mandrel is rotationally driven about a central axis of the mandrel. An aspect of the invention is one, any, or all of the prior aspects in this paragraph up through the first aspect in this paragraph wherein the central axis of the mandrel is aligned with the dwell position wherein an open end of a metallic beverage container can be transferred over and about the mandrel. An aspect of the invention is one, any, or all of the prior aspects in this paragraph up through the first aspect in this paragraph further comprising a source of a fluid pressure associated with the dwell position wherein a force provided by the source of a fluid pressure provides a movement by a metallic beverage can body from the indexer at the dwell position onto the mandrel at the inspection position. An aspect of the invention is one, any, or all of the prior aspects in this paragraph up through the first aspect in this paragraph further comprising a computer having a software routine store on a memory wherein the software routine controls a movement of the indexer. An aspect of the invention is one, any, or all of the prior aspects in this paragraph up through the first aspect in this paragraph further comprising a computer having a software routine stored on a memory wherein the software routine compares an image recorded by the image recorder to a standard stored in the memory to make a determination whether a decoration on a metallic beverage can body is within the standard. An aspect of the invention is one, any, or all of the prior aspects in this paragraph up through the first aspect in this paragraph further comprising a communication link between the inspection apparatus and a metallic beverage container body decorating apparatus. An aspect of the invention is one, any, or all of the prior aspect in this paragraph up through the first aspect in this paragraph further comprising a computer having a software routine stored on a memory wherein the software routine compares an image recorded by the image recorder to a standard stored in the memory to make a determination whether a decoration on a metallic beverage can body is within the standard, wherein a signal is sent via the communication link to the metallic beverage container body decorating apparatus in response to an output of the software routine. An aspect of the invention is one, any, or all of the prior aspects in this paragraph up through the first aspect in this paragraph further comprising a pair of pads separated by a space for accommodating the metallic beverage container body therebetween wherein the metallic beverage container body is supported between the pads wherein an open end of the metallic beverage container body is supported against a first pad and an enclosed end of the metallic beverage container body is supported by a second pad. An aspect of the invention is one, any, or all of the prior aspects in this paragraph up through the first aspect in this paragraph further comprising an ejector positioned between the index path and the manufacturing queue for culling a metallic beverage container body having a detected defect prior to transferring the metallic beverage container body having a detected defect to a subsequent process, wherein the ejector is controlled by a signal originating from a software routine stored in a memory on a computer.

A second aspect of the invention is an apparatus for inspecting a metallic beverage container body comprising an index path along which a plurality of metallic beverage container bodies are sequentially transferred; an indexer which sequentially transfers the metallic beverage container bodies along the index path in a predetermined orientation; a dwell position in operative alignment with the index path wherein the indexer delivers metallic beverage container bodies to the dwell position; an inspection position vertically aligned with and horizontally offset from the dwell position; a mandrel having a generally cylindrical side wall separating a distal end of the mandrel from a proximal end of the mandrel wherein the mandrel is insertable within the metallic beverage container bodies such that the distal end is positioned adjacent an enclosed bottom of the metallic beverage containers and the proximal end is positioned adjacent an open end of the metallic beverage container bodies; an inspection position coincident with the mandrel; an image recorder aimed the inspection position for capturing a plurality of images about a circumference of each of the plurality of metallic beverage containers as each of the plurality of metallic beverage containers completes at least one full rotation about a generally horizontal axis of the mandrel.

A third aspect of the invention is a method of inspecting a metallic beverage container body having decorations applied thereon by a dry offset rotary beverage container body decorator comprising the steps of providing an inspection station subsequent to a decorating operation and prior to a necking and flanging operation; processing a manufacturing queue comprising a plurality of metallic beverage container bodies through the decorating apparatus wherein decoration is applied to each metallic container body; diverting a fraction, or subset, of the plurality of metallic beverage containers in the manufacturing queue to the inspection station subsequent to the processing step; sequentially feeding each of the fraction of the plurality of metallic beverage container bodies to an indexer on the inspection station; indexing each of the fraction of the plurality of metallic beverage containers along an index path to a dwell position; and recording images of each of the fraction of the plurality of metallic beverage containers. An aspect of the invention is one, any, or all of the prior aspects in this paragraph up through the third aspect in this paragraph further comprising the step of transferring each of the fraction of the plurality of metallic beverage containers from the dwell position to an inspection position vertically aligned with and horizontally offset from the dwell position wherein a rotational cylindrical mandrel is associated with the inspection position and each of the fraction of the plurality of metallic beverage containers is loaded one at a time onto the mandrel and rotated with the mandrel as the recording images step is performed. An aspect of the invention is one, any, or all of the prior aspects in this paragraph up through the third aspect in this paragraph further comprising the step of providing a force from a source of fluid pressure which transfers a metallic beverage container body from the dwell position onto the mandrel at the inspection position during the transferring step. An aspect of the invention is one, any, or all of the prior aspects in this paragraph up through the third aspect in this paragraph further comprising the step of providing a computer having a software routine stored on a memory wherein the software routine compares an image recorded by the image recorder to a standard stored in the memory to make a determination whether a decoration on a metallic beverage container body is within the standard. An aspect of the invention is one, any, or all of the prior aspects in this paragraph up through the third aspect in this paragraph further comprising the step of providing a computer having a software routine stored on a memory wherein the software routine compares the recorded images to a standard stored in the memory to make a determination whether a decoration on a metallic beverage can body is within the standard, wherein a signal is sent via a communication link between the inspection station and a dry offset rotary metallic beverage container body decorating apparatus in response to an output of the software routine. An aspect of the invention is one, any, or all of the prior aspects in this paragraph up through the third aspect in this paragraph further comprising the step of automatically making a change in the operation of the dry offset rotary metallic beverage container body decorating apparatus in response to the signal. An aspect of the invention is one, any, or all of the prior aspects in this paragraph up through the third aspect in this paragraph further comprising the step of tracking an identity or position of at least one of the fraction of the plurality of metallic beverage container bodies in the manufacturing queue. An aspect of the invention is one, any, or all of the prior aspects in this paragraph up through the third aspect in this paragraph further comprising the step of associating the identity or position of the at least one of the fraction of the plurality of metallic beverage with a particular transfer blanket on a dry offset rotary metallic beverage container body decorating apparatus. An aspect of the invention is one, any, or all of the prior aspects in this paragraph up through the third aspect in this paragraph further comprising an ejector positioned between the index path and the manufacturing queue for culling a metallic beverage container body having a detected defect prior to transferring the metallic beverage container body having a detected defect to a subsequent process, wherein the ejector is controlled by a signal originating from a software routine stored in a memory on a computer.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 14 is representation of a defective or non-conforming metallic beverage container body being removed from a manufacturing queue via a rejection chute by a source of fluid pressure provided by an air knife.

DETAILED DESCRIPTION

Figure 1:
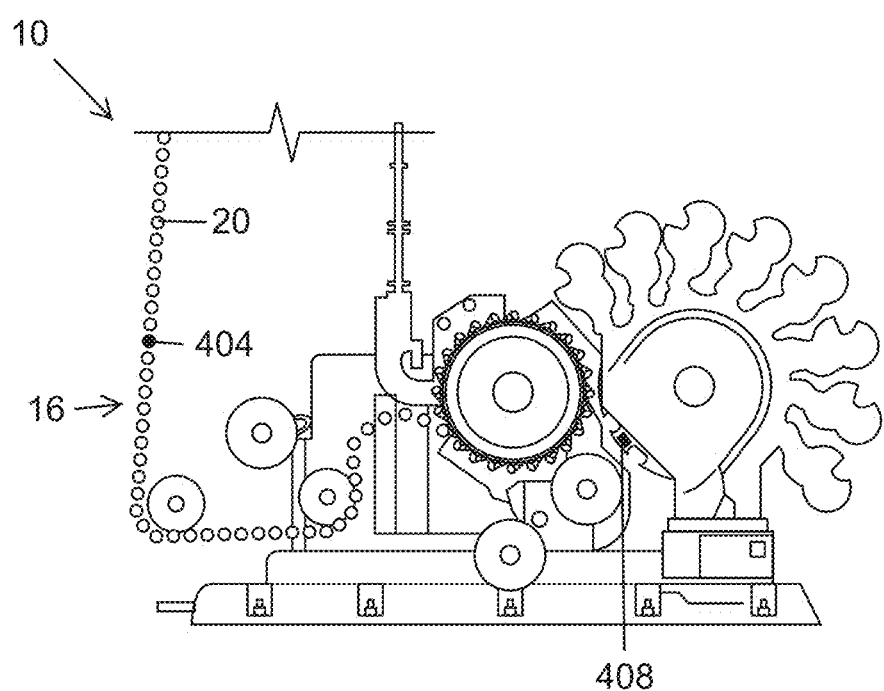
FIG. 1 is a drawing of a metallic beverage container body dry offset rotary decorator.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a dry offset rotary printing or decorating apparatus 10 is illustrated. Relevant to the present invention, decorated metallic beverage container bodies 14 are delivered from the decorating apparatus 10 via a can chain 16 for further processing. A discussion of the dry offset rotary decorating apparatus 10 is set forth in the Background of the Invention and is well-known in the relevant art.

Figure 2:
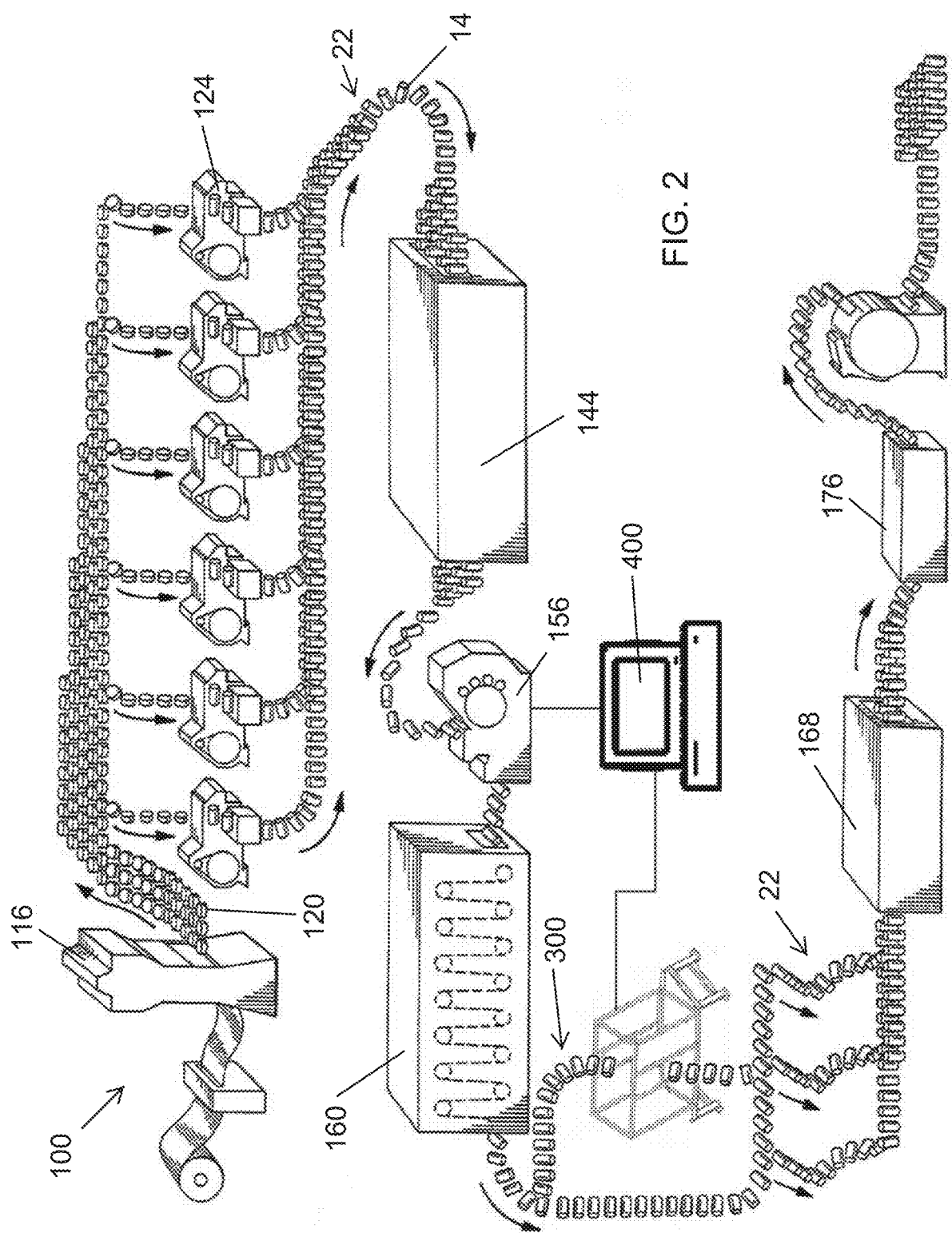
FIG. 2 is a schematic drawing of a metallic beverage container body production process showing a location in the processing sequence of an inspection station according to the present invention.
Figure 3:
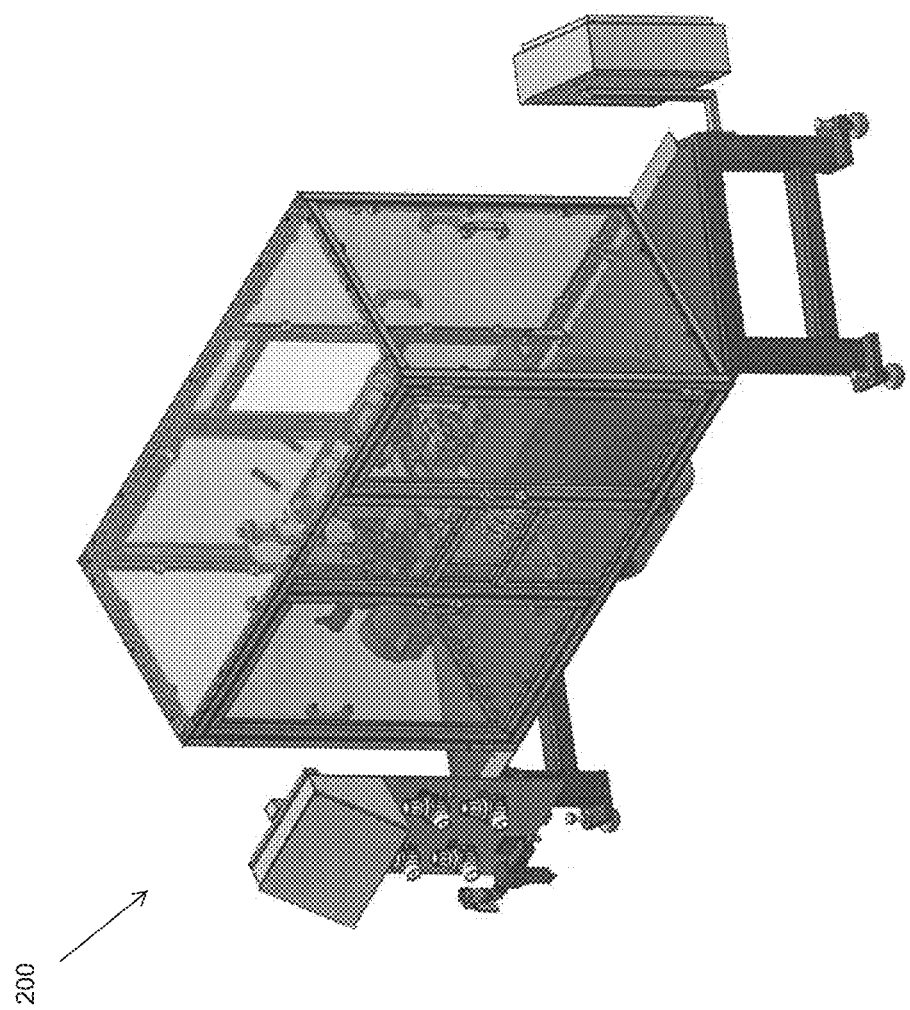
FIG. 3 is a rear side elevated view of an inspection station of the present invention.
Figure 4:
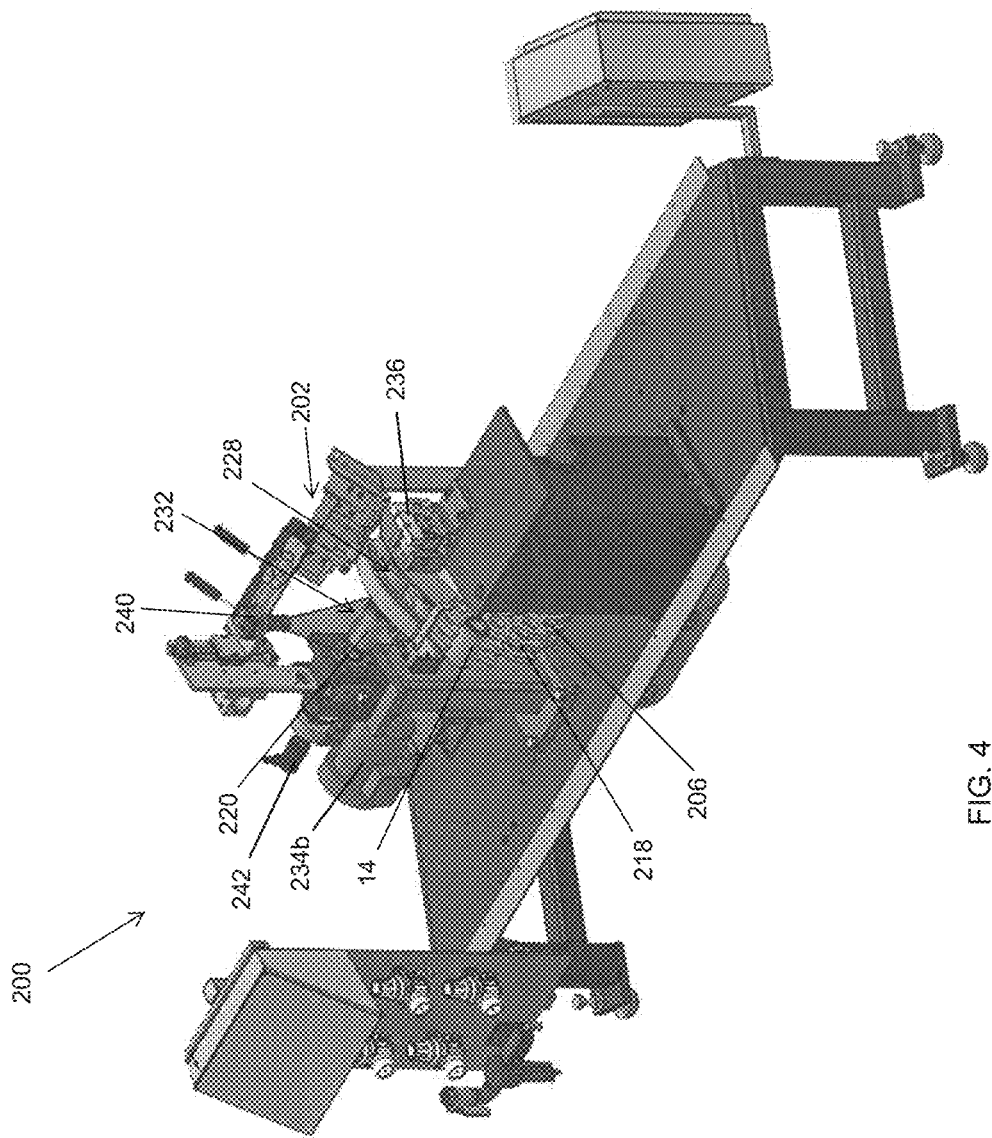
FIG. 4 is a rear side elevated view of an inspection station of the present invention.
Figure 5:
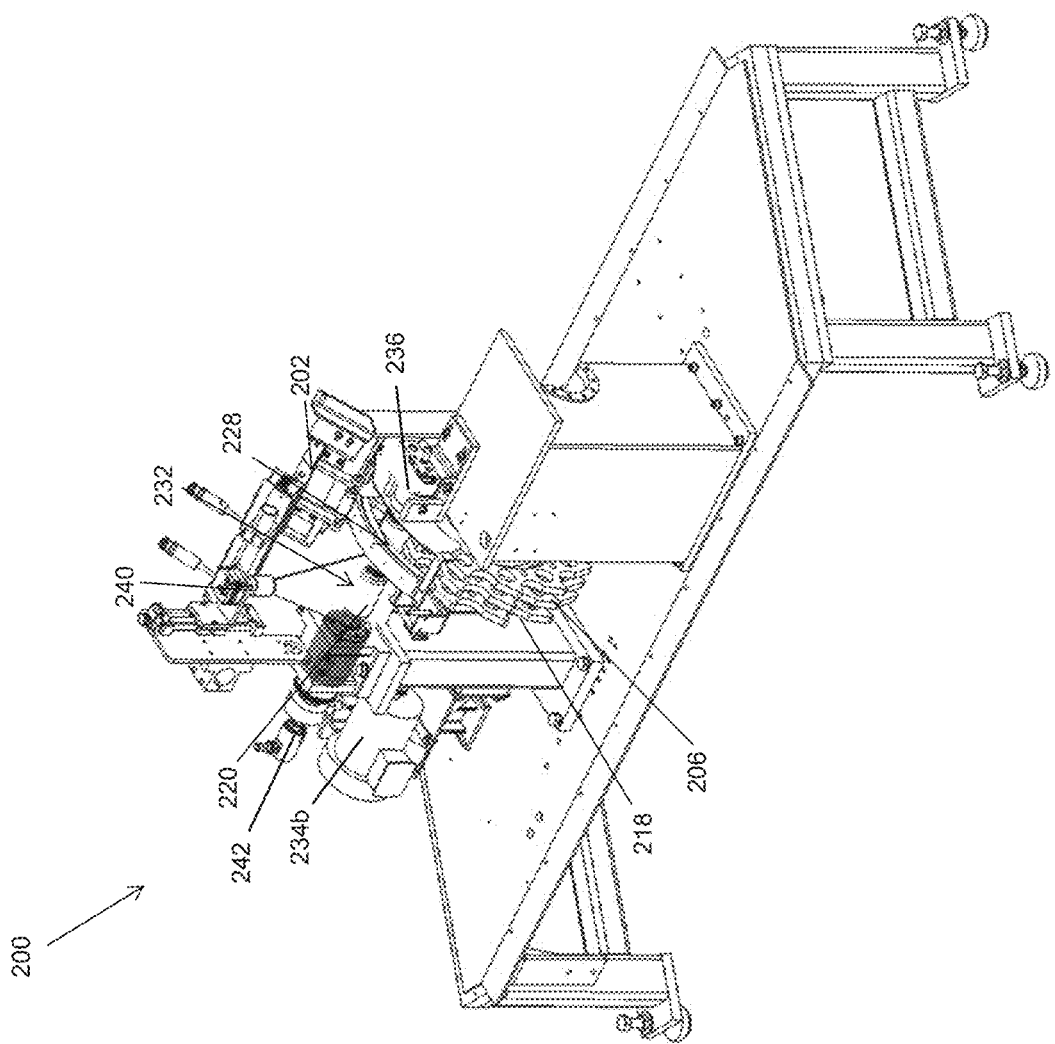
FIG. 5 is a rear side elevated view of an inspection station of the present invention.
Figure 6:
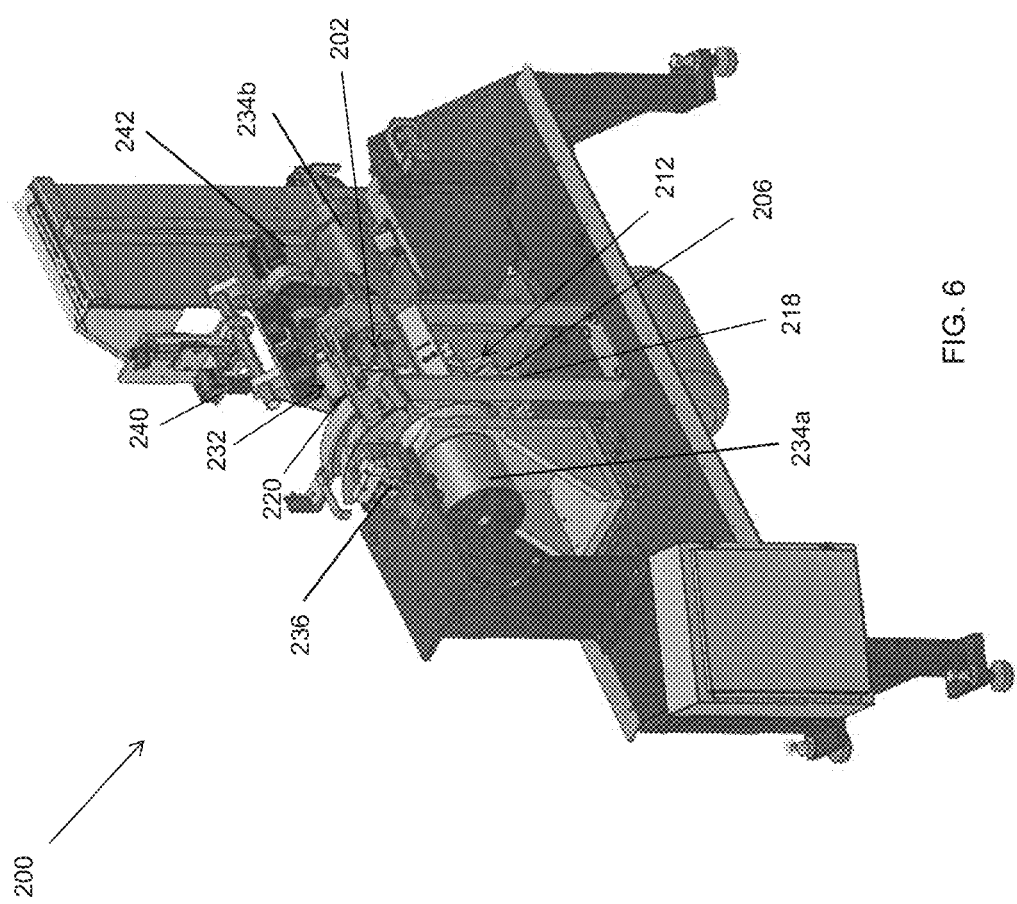
FIG. 6 is a rear side elevated view of an inspection station of the present invention.
Figure 7:
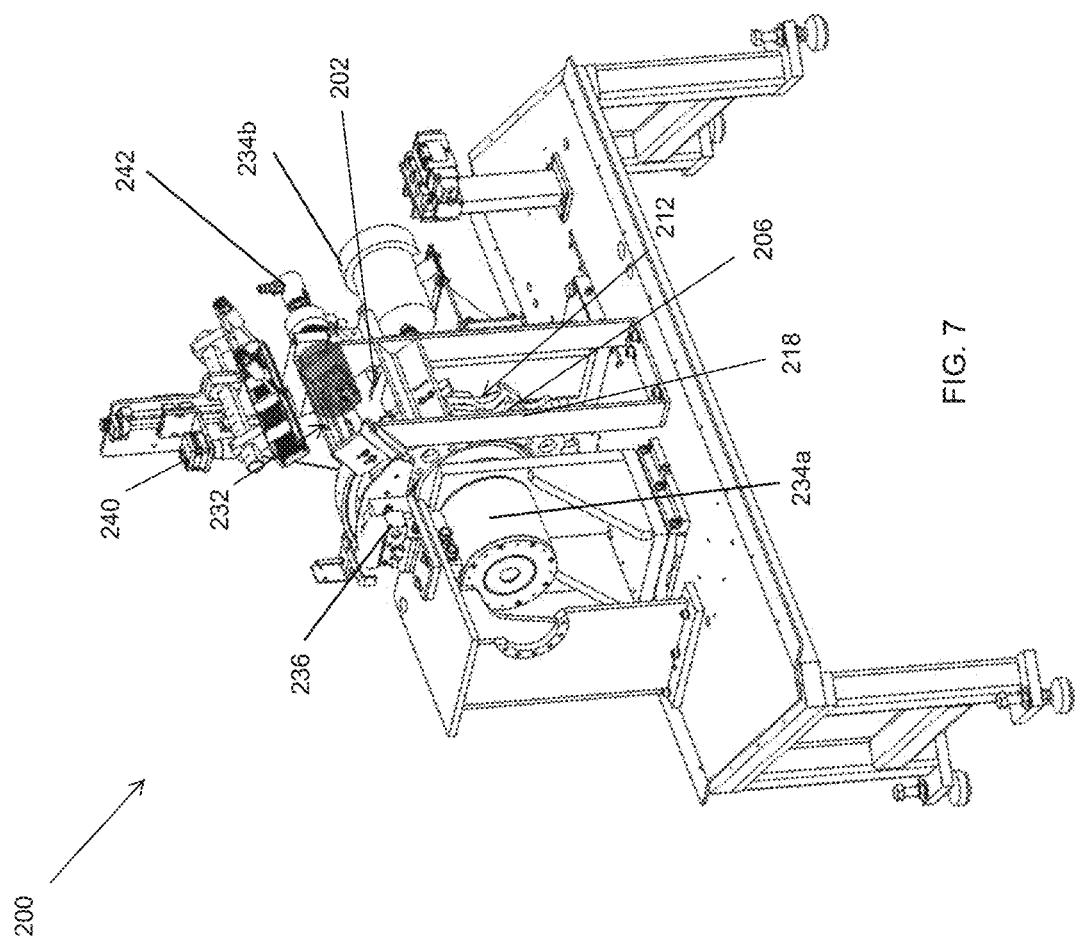
FIG. 7 is a rear side elevated view of an inspection station of the present invention.
Figure 8:
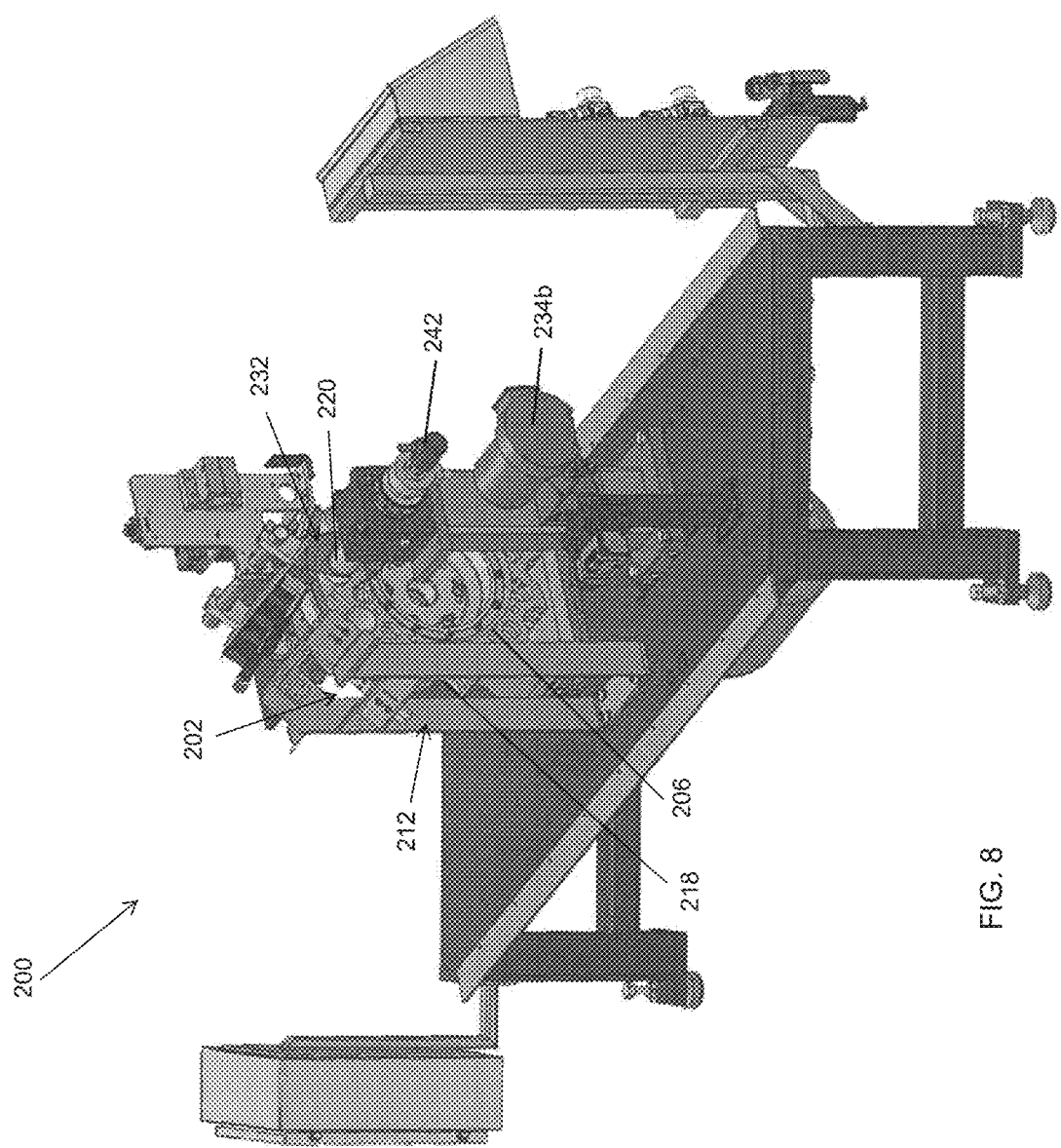
FIG. 8 is a front side elevated view of an inspection station of the present invention.

Referring to FIG. 2, a typical process 100 for producing metallic beverage container bodies 14 is illustrated. The process 100 includes a cupper station 116 which deforms a flat metal blank in a drawing process to form a shallow cup 120. Once complete, the shallow cups 120 drop from the cupper station 116 onto a cup conveyor for transfer to the next station.

The shallow cups 120 are transferred continuously to one or more bodymaker stations 124. Each bodymaker station 124 includes tooling for drawing and thinning the shallow cups 120 to form thin-walled tubular container bodies 14 having an open end and an opposing closed end, which are joined by a cylindrical side wall. Each bodymaker station 124 contains a tool called a punch, which forms the shape of the container body 14 by forcing the cup 120 through a series of progressively smaller circular ironing rings. This action draws the metal up the sides of the punch, ironing it into a container body 14. As the cup 120 is forced through the rings, its diameter is reduced, its walls are thinned and its height is increased. At the end of the punch stroke, the bottom is formed into a dome shape that strengthens the bottom of the container body 14. During this process, referred to as wall ironing, the metal must be lubricated to reduce frictional heat.

The thin-walled, tubular container bodies 14 are transferred from the bodymakers 124 to trimmer stations. Each trimmer station includes a knife for shearing excess material about the open ends of the tubular container bodies 14. This process adapts the container bodies 14 to a uniform, predetermined height.

The container bodies 14 are then continuously transferred to a washer station 144. The washer removes the forming lubricants before the application of outside decoration (or label) and inside protective coating. The washed container bodies 14 are discharged through a dryer station where the container bodies 14 are dried with forced hot air.

Depending on end user requirements, a base layer of coating can be applied to the outer surface of the container bodies 14 at a base coater station. The base coating layer is generally a white or clear base coat. The container bodies 14 are then continuously transferred to a decorative coating station 156, which includes a decorating apparatus, such as the dry offset rotary decorating apparatus 10 illustrated in FIG. 1. The decorative coating station 156 applies a decorative layer of coating (ink) to the outer surface of the thin-walled tubular container bodies 14. The inked container bodies 14 move to a rotating varnish application roll that applies a clear coating over the entire outer sidewall. The clear coating protects the ink from scratching and contains lubricants that facilitate can conveying.

The container bodies 14 are transferred from the decorator 156 onto a pin 20 of a chain 16 (so that only the inside surface is contacted) and is conveyed through a decorator coating, or "pin," oven/drier station 160 where the ink is dried with forced hot air.

Following application and curing of the exterior decorative layer, the container bodies 14 are conveyed to an inner surface coater station. This station includes a bank of spray machines that spray the inner surfaces of the container bodies 14 with an epoxy-based organic protective coating. The inside coating is also cured by forced hot air at another dryer station 168. The coating prevents the beverage from contacting or reacting with the metal of the inner surface of the container body 14.

After the container bodies 14 leave the drier station 160, they pass through a lubricator station that applies a thin film of lubricant to the exterior of the top (open end) where a neck and a flange will be formed. A necker/flanger station 176 reduces the diameter of the open ends of the container bodies 14, and gives the cans the characteristic neck shape. Here the diameter of the top of the can is reduced or "necked-in." The top of the can is flanged outwards to enable the end to be seamed on after the cans are filled with a beverage. Following this step, a finished or substantially finished, as in suitable for use by a beverage manufacturer, container body 14 is produced.

The present invention incorporates an inspection station 200 subsequent to the decorating station 156 in a metallic beverage container body manufacturing process and prior to necking and flanging. In terms of process steps, the inspection station 200 is located after blanking, cupping, body making (also known as draw and iron, "DI"), trimming, washing, and decorating stations, and optionally post-decoration oven station, but prior to necking and flanging stations. Thus, the metallic beverage container body 14 to be inspected has a cylindrical sidewall separating an open end from an integral closed end wherein a portion of the sidewall immediately adjacent the open end has a circumference that is substantially equal to the circumference of a portion of the sidewall adjacent the integral bottom portion.

It follows that one purpose of the invention is to inspect the quality of the decorations produced on the container bodies 14. Another purpose is to inspect the quality of the metal forming of the sidewalls produced by the DI process and subsequent trimming of the container bodies 14.

Specific examples of characteristics that the inspection station 200 can identify include, but are not limited to, quality of a printed bar code, damaged (e.g. cut or torn) ink transfer blankets, color recognition or variation, alignment of the components of the dry offset rotary decorator, ink splatter, poor overlap (there must be spacing between colors on a container body of about 0.005 inches (0.013 mm), generally caused by alignment issues between a transfer blanket and a printing plate), varnish defects, and washer contamination. The inspection station 200 can also identify dents and pleats in the metal. From the bodymaker to the trimmer, denting can occur from handling and container body transfer equipment. However, most metal damage, such as dents and pleats, occur later in the container body making process during necking and flanging.

The inspection station 200 of the present invention replaces the current method of post-decoration inspection which is done by hand (i.e., manually). Currently, a person randomly samples container bodies by hand post-decoration, and those randomly sampled container bodies must be scrapped. The present invention inspects container bodies post-decoration, and the container bodies are returned to the production process. Thus, the inspection station 200 identifies pre- and post-decoration defects which allows corrective action to take place prior to producing thousands of defective or non-conforming container bodies because, for example, the rate of container body production in a typical process such as the one described herein reaches about 2000 container bodies per minute or 30,000 container bodies in the 15 minutes elapsed time interval that is common under a manual inspection performed by a person.

It is contemplated that the inspection station 200 will be installed as close to the end of the decorating station 156 as possible, to minimize bad (i.e. defective, sub-standard, non-conforming) container body production. By moving the inspection closer to the decorator, fewer "bad cans" are produced prior to discovering and resolving the manufacturing process causing the defects. This station 200 is primarily looking for decoration defects. It has been determined that the preferred location of the inspection station 200 is after the pin oven 160. This inspection station 200 will reduce the number of bad cans that are made.

The inspection station 200 operates on an indexing operation. As shown in FIGS. 4-8, the indexer can be a turret 206 that sequentially transfers container bodies 14 through the inspection station 200 along an index path in a predetermined, generally constant, orientation, here via counter-clockwise rotation. In this example, the decorated container bodies 14 are fed to the inspection station 200 via an infeed rail 202 to the index path at an entrance position 204 on a multi-position turret 206 and are discharged from the inspection station 200 at the exit position 212.

Figure 9:
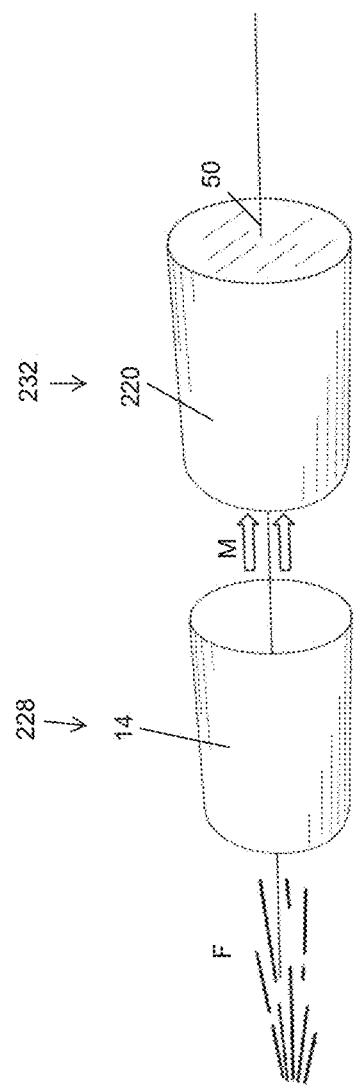
FIG. 9 shows a metallic beverage container body at a dwell position prior to being transferred to an inspection position and corresponding forces provided by a source of a fluid pressure and a movement cause by same.
Figure 10:
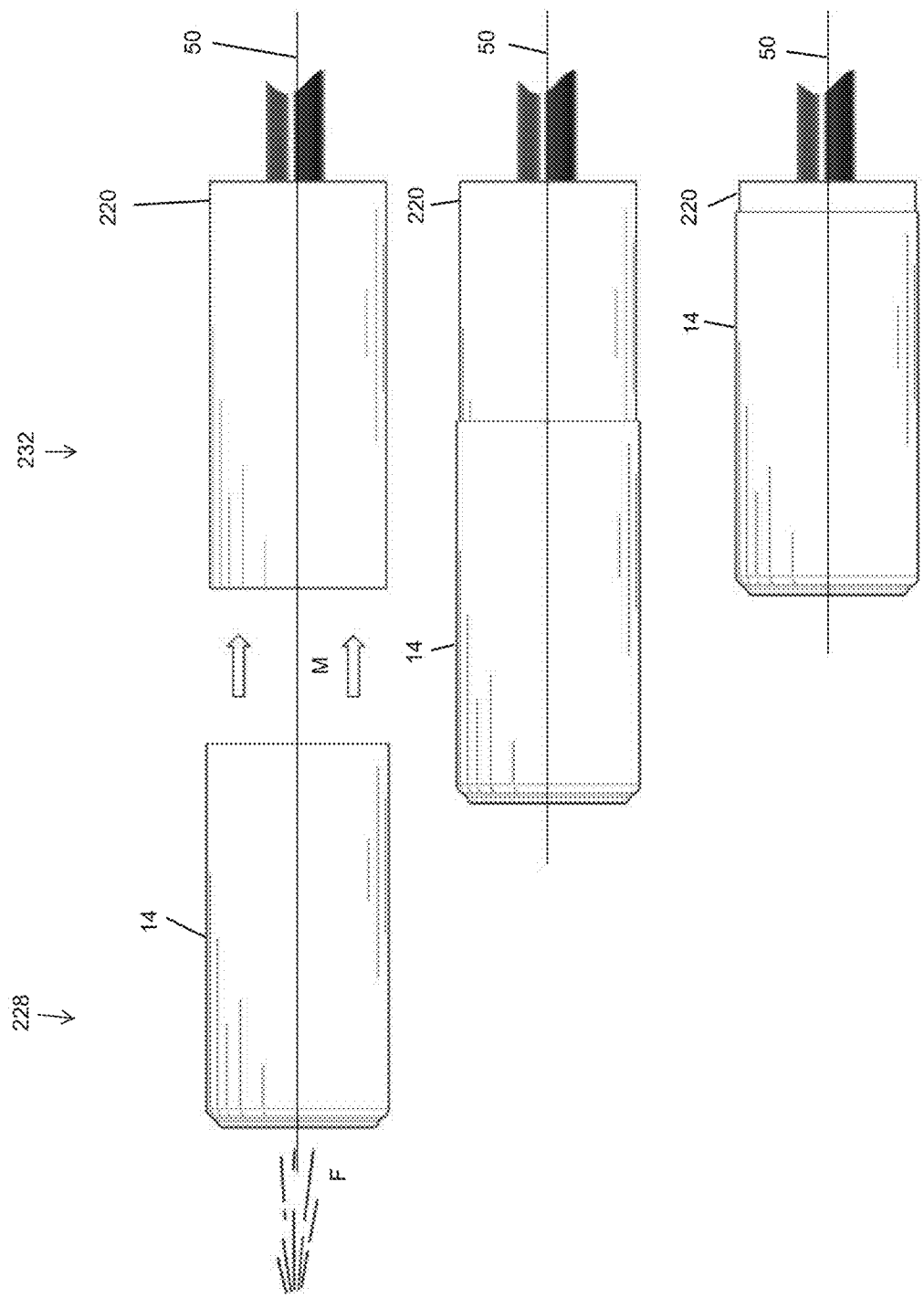
FIG. 10 shows a metallic beverage container body moving from a dwell position to an inspection position and onto a mandrel.

The circumferential turret 206 rotates about a central axis. It has a plurality of pockets 218 adapted, as in sized and shaped, to support, control, and properly retain the sidewall of the container bodies 14 therein in a predetermined orientation and to prevent misalignment of the container body 14 relative to a mandrel 220, which is used during the act of inspecting the container body 14. The turret acts as an isolating device to take a container body 14 off of the trackwork, which is used to transport container bodies 14 through this portion of the manufacturing process, and index the container bodies 14 into position for inspection. The container bodies 14 are blown onto the mandrel 220 for inspection and blown off of the mandrel 220 back onto the turret 206 after inspection (see, e.g., FIGS. 9-11). The turret then indexes and while loading one container body 14, it discharges the inspected container body.

In one embodiment, the container bodies 14 are loaded onto the turret 206 at the 10 o'clock position on the turret 206; the turret 206 rotates clockwise; and the container bodies are discharged beyond the 12 o'clock position, which is a dwell position 228. In the example illustrated, container bodies 14 are loaded at the 10 o'clock position, discharged at the 2 o'clock position. Rejected container bodies 14 are removed from the manufacturing queue into a chute very near the discharge position. Here, the frame of reference is facing the open end of the container body 14 on the turret 206, and the container bodies 14 move towards the viewer as the open ends of the container bodies are loaded onto the mandrel 220.

Thus, container bodies 14 enter the inspection station 200 via the infeed rail 202 and are loaded onto one of a plurality of positions on the turret 206. The container bodies 14 are then indexed in a clockwise direction by the turret 206 to the dwell position 228, which is at the 12 o'clock position using a clock-like orientation in the embodiment illustrated and then transferred one at a time onto the mandrel 220 at an inspection position 232. The inspection position 232 is vertically aligned with and horizontally offset from the dwell position 210 (see FIG. 9). Servo technology, which employs a servo motor 234a, is used to index the turret 206 towards the inspection position 232 comprising a container body-over-mandrel application.

The container body 14 is loaded onto the mandrel 220 at the inspection position 232 to reduce container body deformation during spinning. Mandrel spinning, which is variable and also controlled by a servo motor 234b, transfers spinning to the container body 14 while images of the side wall are being captured. This provides an inspection of an entire circumference of the container body side wall. Thus, the mandrel 220 provides support for the extremely thin metal, on the order of 0.005 inches (0.13 mm) or less, of the container body side wall, so that when the container body 14 is spun, it will not develop mechanical deformities due to forces exerted on the thin-walled side wall during spinning. If the container body 14 is not loaded on a mandrel 220, the side wall is not stabilized because it does not yet have a neck of reducing diameter, which is not added or formed at the open end of the side wall until it passes through the necking and flanging stations. The container body 14 rotates with rotation of the mandrel 220, at least about 360 degrees. Then, it is indexed to the exit or discharge position 212 wherein it is removed from the inspection station 200 and sent back to a manufacturing queue 22 for further processing (e.g. necking and flanging) or rejected at a rejection position 216 where the container body 14 is removed prior to returning to the manufacturing queue 22.

The spin speed of the mandrel 220 is variable to match the maximum grip rate of an imager. The mandrel rotation speed is variable to minimize image acquisition time. It may be provided by a variable frequency drive. It could also be servo controlled, DC motor controlled, or by other means. The important fact is that the spin speed can be varied.

The mandrel 220 is similarly shaped to the container bodies 14. Accordingly, it has a generally cylindrical side wall separating a distal end of the mandrel from a proximal end of the mandrel wherein the mandrel 220 is insertable within the metallic beverage container bodies such that the distal end is positioned adjacent an enclosed bottom of the metallic beverage containers and the proximal end is positioned adjacent an open end of the metallic beverage container bodies. The proximal end is attached to a shaft which is joined to a motor to drive rotation of the mandrel 220. The mandrel 220 spins about a central, generally horizontal, axis 50 which corresponds to a similar axis of the container body when it is located at the dwell position such that container body transfer from the dwell position 228 to the inspection position 232 is facilitated (see FIG. 9).

At the dwell position 228, the container body 14 is removed from the indexer, in this case the rotary turret 206, and loaded onto the mandrel 220 coincident with the inspection position 232. A force F provided by a source fluid pressure 236 causes the container body 14 to be removed from the turret 206 and transferred onto the mandrel 220. Thus, the force F causes a movement M by a metallic beverage container body 14 which transfers the container body 14 from the indexer 206 at the dwell position 228 onto and over or about the mandrel 220 at the inspection position 232 across the horizontal offset between dwell position 228 and the inspection position 232. The imager, in this a camera 240, is mounted to the inspection station 200 and pointed at the mandrel 220.

Figure 11:
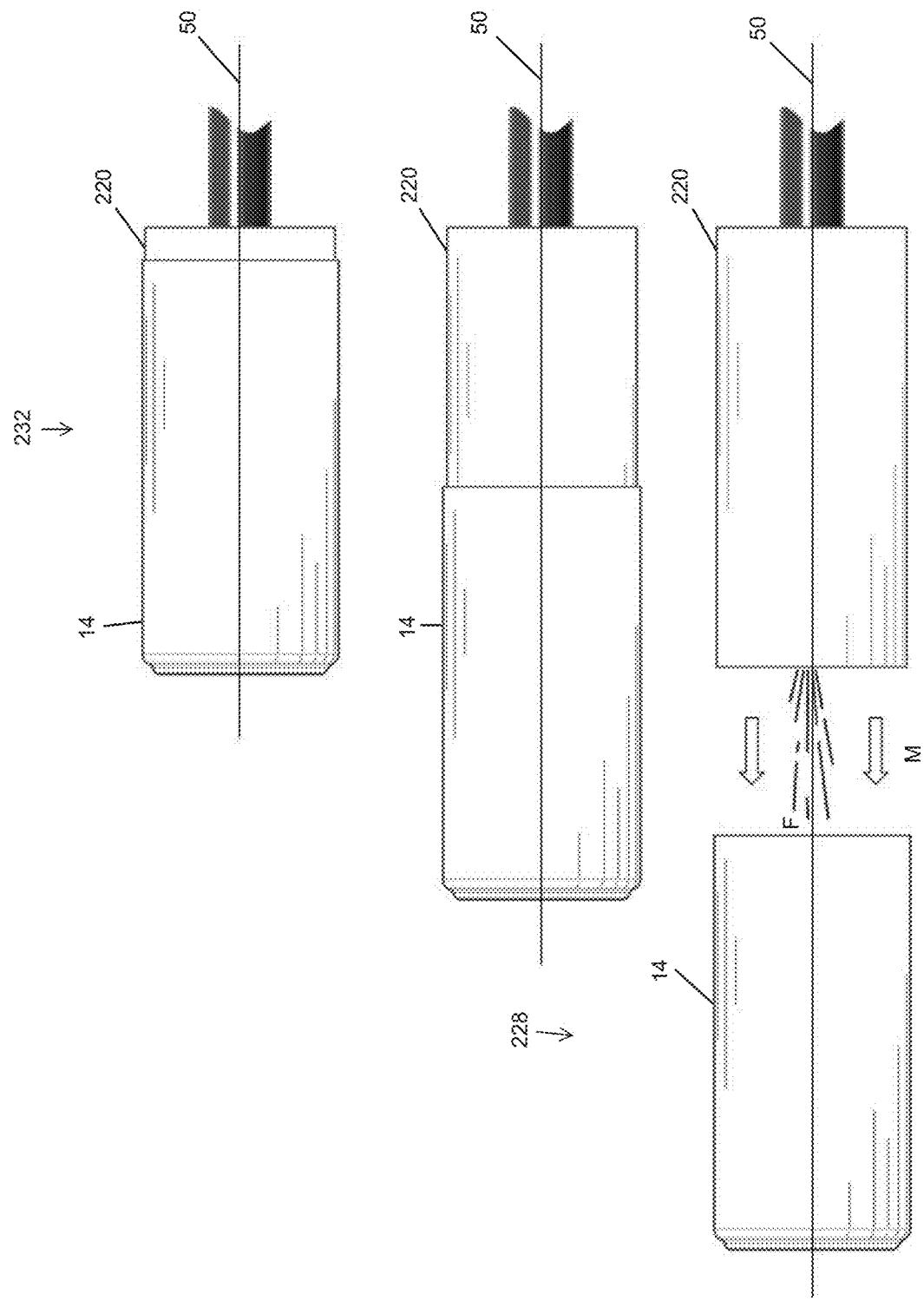
FIG. 11 shows a metallic beverage container body being removed from a mandrel by a source of fluid pressure.
Figure 12:
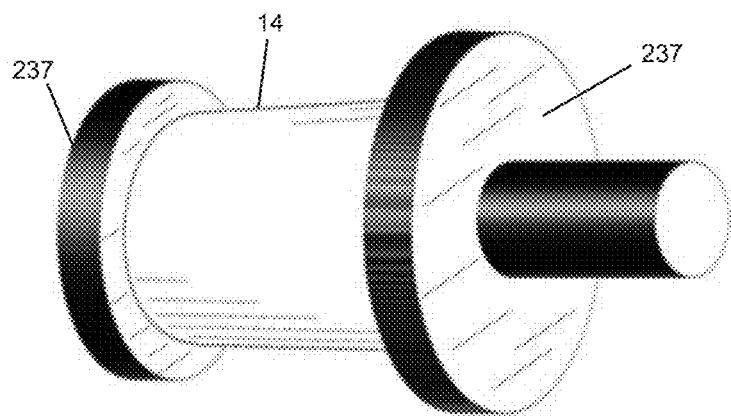
FIG. 12 shows a metallic beverage container body at an inspection position and supported by opposing pads.
Figure 13:
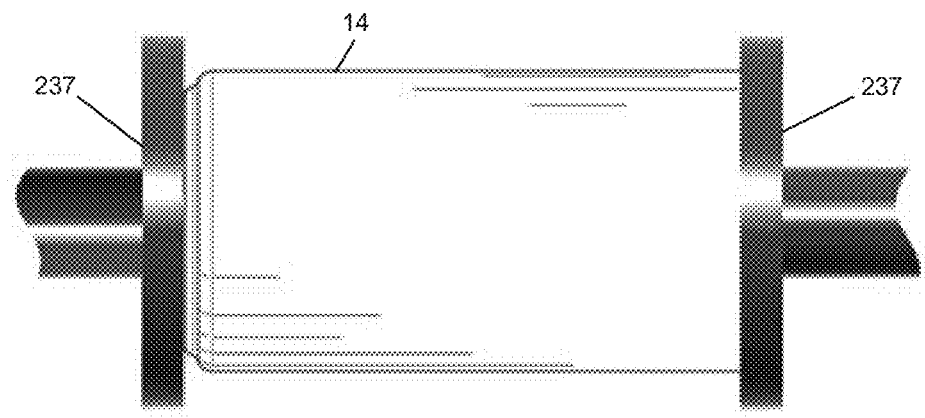
FIG. 13 is an alternate view of the arrangement illustrated in FIG. 12.

An alternative to the mandrel 220 is illustrated in FIGS. 11 and 12. Here, disks or pads 237 engage the open end and opposing closed end of the container bodies 14. The engagement supports the thin-walled side wall through movement from the dwell position to the inspection position and during inspection. The pads 237 are further provided to impart rotation to the container bodies 14 during inspection. The pads 237 may be attached to shafts which are operatively connected to servo motors 234b to cause the necessary or desired rotation of the container bodies 14 during inspection.

Alternatively, in one embodiment, one or more stepper motors are used instead of servo technology. This allows microstepping. A stepper motor is a polyphase AC synchronous, and it is ideally driven by sinusoidal current. Microstepping is often "sine cosine microstepping" in which the winding current approximates a sinusoidal AC waveform. Sine cosine microstepping is the most common form, but other waveforms can be used. Regardless of the waveform used, as the microsteps become smaller, motor operation becomes more smooth, thereby greatly reducing resonance in any parts the motor may be connected to, as well as the motor itself.

The mandrel 220 spins or rotates about a horizontal axis 50, preferably continuously. An encoder activates an inspection window and closes the inspection window. This assures that the camera 240 has captured an image of the container body 14 through 360 degrees of rotation of the cylindrical side wall.

The encoder measures the degrees of rotation of the mandrel 220 and the container body 14 on the mandrel 220. In this way, the encoder, such as a rotary position sensor, is used to track rotational movement of the mandrel 220. A separate encoder tracks movement of the turret 206 and communicates the information to a computer 400 for positional control. In some embodiments, this information is used to make a proper disposition of each container body processed through the inspection station 200, i.e. either pass or fail, reject or return to the queue 22.

The encoder is used to generate an electrical signal corresponding to a representation of position. The encoder is a mechanical component connected directly to the mandrel 220. Approximately every 1/1000 of a revolution, it generates a reading or a signal; however, it can be set at any desired interval, e.g. 10,000 references per revolution. It gives an electrical pulse per percentage of rotation. Based on those pulses, the camera 240 takes a photo so it can capture images over 360 degrees of the container body side wall surface.

Thus, the inspection station 200 includes an image technology to capture and record desired images of the container body 14 with one or more image recorders, preferably digital cameras 240. Line scan technology may be employed to take a container body image. A snap shot photograph of the container body 14 is taken as the container body 14 is rotated with, or by, the mandrel 220 rotation to capture images of an entire circumference of the container body 14 as the container body 14 completes at least one full rotation about the central, generally horizontal axis of the mandrel 220. Preferably, as illustrated, the container body 14 is rotated about a center horizontal axis 50 at the inspection position 232 wherein the indexer dwells for a predetermined time interval wherein indexing of the container bodies 14 is paused to allow the photographs to be taken as the container body 14 is rotated about a central horizontal axis.

The present invention preferably employs line scan technology. Approximately 1024 photographs of the container body 14 are taken as it is rotating. The photographs are stitched together using a software routine to produce a composite image of the container body 14. This allows the apparatus to take a strip of the container body 14 at high resolution and build a composite image of 360 degree of the container body 14 one strip at a time. This process allows the current apparatus to detect smaller defects.

The photographs are collected by a computer system, which may comprise one or more computers 400 and/or controllers in communication with one another and in communication with the camera 240. The software routine is stored in a memory on the system. Upon execution of the software routine, the composite image is created and outputted by the software. A further software may perform a pass/fail analysis on the composite image or any individual photograph or photographs to determine the quality of the container body decoration and to determine, and report the identity of, the particular transfer blanket or transfer blankets on the dry offset decorating apparatus 10 that produced the defective decoration.

The individual photographs may capture an image of a section of the circumference of the entire height of the container body 14, from the open end to the enclosed bottom portion. Alternatively, the individual photographs may capture an image of a section of a circumference of the container body 14 and only a portion of the height of the container body 14. However, in either case, the composite image includes images of at least a portion of the entire height and the entire circumference of the container body 14 stitched together to form the composite image. Stated another way, a plurality of images of at least a portion of the height of the container body 14 from the open end to the enclosed end and about the entire circumference of the container body 14 are recorded and processed to arrive at the composite image.

Once image collection is completed, the container body 14 is returned to the dwell position 228. Container body movement is again actuated by a force provided by a source of fluid pressure 242 associated with the mandrel 220 and the inspection position 232 which causes the inspected container body 14 to transfer from the mandrel 220 across the horizontal offset to the indexer in the dwell position 228, thus back to the index path (see FIG. 10).

In one embodiment, the imager utilizes three dimensional technology, wherein the curvature of the cylindrical side wall of the container bodies 14 can be viewed.

In a specific embodiment illustrated, container bodies 14 are discharged from a drier 168 onto a mass conveyor. A sample set 300 comprising a fraction, or subset, of a plurality of container bodies 14 in the manufacturing queue 22 is diverted from the manufacturing queue 22 to the inspection station 200. The plurality of container bodies may comprise a randomly selected grouping of container bodies; however, more preferably, the number of container bodies 14 in the sample set 300 corresponds to a number of transfer blankets on the dry offset printing apparatus 10 wherein a container body 14 representative of each transfer blanket on the decorator is inspected (i.e., a particular container body that received ink from a particular transfer blanket).

For example, a dry offset rotary decorator 10 may have from 8 transfer blankets. The sample set 300 would include 8 consecutively decorated container bodies 14 wherein 8 container bodies 14 decorated by each of the 8 transfer blankets is represented in the sample set 300. This allows the inspection station 200 to identify the precise transfer blanket that produces each container body 14 in the sample set 300. Thus, if only one or more transfer blankets are torn, damaged, or otherwise producing poor quality container body decorations, by sampling and inspecting 8 consecutive container bodies 14, one can identify the exact transfer blanket or blankets that are performing in a substandard manner.

In one embodiment, rejection of a non-conforming container body takes place on the track work. A container body ejection sensor ensures that a container body 14 having a defect is rejected. An air knife 248 is used to blow the container body 14 into a reject chute 252. A control system flags defective container body 14 as defective as it passes by a sensor. The defective container body 14 is tracked until it reaches the rejection chute 252. When it senses that the defective container body 14 is passing the reject chute 252, the air knife 248 blows the defective container body 14 into the reject chute 252. (See FIG. 14).

In one embodiment, a container body 14 approaches the inspection station 200. The container body is moved to a dwell position 228 on the inspection station 200. The container body 14 is loaded onto the mandrel 220, which is already spinning. An imager, such as a camera 240, acquires images of the container body 14, a software stored on a memory of on a computer 400 controls processing of the images and comparison of the images against a standard also stored on the memory. The container body 14 is blown off the mandrel 220 and indexed or moved from the inspection position 232. A software on the computer 400 analyzes whether container body 14 is acceptable or unacceptable by comparing the images to the standard to make a determination whether a decoration on a metallic beverage can body is within the standard. Then, based on the good container body/bad container body analysis, a disposition (reject or keep) of the tested container body is determined. As used here, the term "standard" refers to the manufacturing, physical, and visual quality manufacturing tolerance of the container body decoration and, optionally, the condition of the surface shape of the container body.

In one embodiment, the inspection station 200 includes a computer 400 having a software stored in a memory. The software compares a composite image of the container body decoration against a standard image of a container body decoration. The software compares colors and printed decorations to identify transfer blanket defects, among other defects associated with container body decorating on a dry offset beverage can decorating apparatus. For example, the software can identify misalignment issues on the decorated container body (whether overlap is correct) and pattern skew. The software also communicates corrective actions that must be taken to correct the defects. If a color variation is detected, either a signal is sent directly to the decorator 156 to make an automatic adjustment using a software or a signal is sent to an operator to make those adjustments manually. Color variation is often due to low ink or low roller pressure. The corrective actions would be to add more ink or to adjust the roller pressure. If there is a defect in a transfer blanket, the decorator 156 production may be halted to enable manufacturing personnel to change the transfer blanket and to prevent production of additional non-conforming product. If there are misspellings or wrong product/bar codes, a printing plate would be changed, as the plate must have an error.

A programmable controller which may be included with the computer 400 is in communication with the inspection station 200 and the one or more servo motors which drive the turret 206 on the inspection station 200. It can be used to program the turret 206 to any predetermined dwell time independent of the speed or rate of container body production or in conjunction therewith to ensure a continuous processing of container bodies 14 through the manufacturing process 100 without any one station moving slower than another. In other words, the inspection station 200 is not a bottleneck operationally to the process 100. Thus, inspection station 200 can be programmed based on time without mechanical intervention. This is very important as other technology improves.

It should be understood that the inspection station 200 is fully programmable, and any number of dwell time preferences can be achieved on the same station 200 without the need for mechanical changes to the station 200.

Furthermore, the controller is capable of synchronizing the movement of the indexer with the overall manufacturing process 100. It generally follows that the programmable controller which may be housed on the computer 400 can be used to control the timing of the inspection station 200 without unnecessarily long dwell times wherein container bodies 14 rest without being formed, reformed, flanged, or inspected. Thus, the computer 400 may have a software routine store on a memory wherein the software routine controls a movement of the indexer.

With this present invention, there is flexibility to adjust any of the component pieces, using an infinite number of adjustments. Throughput is no longer a limitation for inspection. At least 185 container bodies per minute can be inspected.

Most available camera inspection systems are fixed speed. One advantage of the present inspection station 200 is that a user can adjust the dwell time for the camera 240 due to servo control. It follows that a user may also slow the rate or dwell down if more time is needed. Thus, a user may increase and decrease the rate as necessary or desired. Therefore, as camera technology improves and images can be obtained in a shorter duration dwell time, the present inspection station 200 can be operated selectively at a faster rate. For example, as the inspection station index rate is increased, the rate at which the container bodies 14 rotate must also be increased to ensure that a least 360 degrees of photos or images are captured about the cylindrical side wall of the container body 14. The adjustability of the dwell and index rate is one of the advantages of the servo technology In one embodiment, there is a communication link between the inspection station 200 and a metallic beverage container body decorating station 156. This communication link may be provided wirelessly or wired as illustrated. The computer 400 may be electrically connected to the inspection station 200 and the decorating station 156. A software on the computer 400 controls functionality of the decorating station 156 based on results of the analysis of the images or stitched together images derived at the inspection station 200. Accordingly, a signal may be sent via the communication link to the metallic beverage container body decorating apparatus 10 in response to an output of the software routine. This signal may contain information, access information, or activate a software routine that causes an automated change in the operating parameters of the decorating station 156. This software and computer 400 closes the loop back to the decorating station 156 to automatically adjust the decorating station 156.

In another embodiment, a software on the computer 400 is used to detect color hue on the container bodies 14, for example wavelength, saturation also called "chroma", and brightness also called "luminance" or "value," which is the shade (darkness) or tint (lightness) of a color. This software can also close the loop and be used to automatically adjust the decorating station 156 to obtain the correct hue.

In another embodiment, a sensor can be used and directed at a specific portion of the container body 14 to detect color hue.

In another embodiment, a camera 240 does a complete scan of all of the colors on a decorated container body 14 and a software on the computer 240 quantitatively and/or qualitatively analyzes the colors on the container bodies 14 and automatically adjusts the decorating station 156 to correct a non-conforming color characteristic when one arises. For example, the camera 240 and software may determine that the color red is light 3%, and automatically adjust the decorating station 156 or decorating apparatus 10.

In one embodiment, proportional integrative derivative (or "PID") is used within the software. PID involves analysis of the container body 14, deciding whether a non-conforming situation exists, determining whether a decorating station 156 change is necessary, making the change, then checking whether the corrective action results in correction of the non-conforming characteristic. Again, this is a closed loop system.

In one embodiment this is accomplished by performing a line scan label inspection. A camera technology that is known to be capable of line scan label inspection is produced by Applied Vision.

According to another embodiment, inspection is performed on a sampling basis wherein a sample size (i.e. a fraction, or subset, of the overall number of container bodies in the manufacturing queue 22) of the container bodies 14, for example about 10% of the container bodies in the manufacturing queue 22. In this embodiment, fewer than 100% of the container bodies decorated on the decorating apparatus 10 are inspected.

In one embodiment, the sample size is equal to the number of transfer blankets on the dry offset beverage container body decorator 10. In this embodiment, the sample size includes a number of consecutively decorated container bodies 14 wherein the number is equal to the number of transfer blankets or the number of mandrels on the decorator 10.

In one illustrative example, the decorating apparatus 10 has 24 transfer blankets. Therefore, 24 consecutive container bodies from the manufacturing queue 22 are diverted to and through the inspection station 200. This sample size and sampling method represents one container body decorated by each of the 24 transfer blankets. This sampling can begin with a container body 14 produced or decorated by any of the transfer blankets as long as all of the transfer blankets are represented in the sample.

Alternatively, the sampling can begin with a predetermined transfer blanket which facilitates identifying the particular transfer blanket that produced a defectively decorated container body. This can be accomplished by tagging a position on the chain 16, e.g., with an RFID tag or the like 404, and sensing the tag or tags 404 by a position on the decorator, e.g. a particular transfer blanket 408, the identity of which can be stored on the computer 400 along with the chain 16 position of the container body 14 decorated by the particular transfer blanket wherein a plurality of container bodies 14 in the sample set 300 is determined or selected by a software program stored on the memory on the computer 400.

It follows that an embodiment of the invention includes tracking an identity or position of at least one of the fraction of the plurality of metallic beverage container bodies in the manufacturing queue 22. Further, the identity or position of the at least one of the fraction of the plurality of metallic beverage is associated with a particular transfer blanket on a dry offset rotary metallic beverage container body decorating apparatus 10. These steps can be performed via software stored on the memory of the computer 400 and the RFID tagging. Tracking a pin or pins on which freshly decorated container bodies are transferred from the decorating station 156.

In one illustrative example, the inspection station 200 inspects about 240 cans/minute. In another illustrative example, the inspection station 200 inspects 150 cans/minute about a full 360 degrees of the circumference of each metallic beverage container body.

In another embodiment, the inspection station 200 runs at 300 cans per minute or more. This is based on the combined move time and dwell time required by the inspection process. As the move time and the dwell time are reduced, throughput is increased. In the future, the inventors contemplate that this invention will be capable of inspecting 400 to 600 containers per minute. If more limited inspection of each container body is performed, the number of inspections may exceed 1000 to 2000 containers per minute. A servo motor is used to control dwell and index time. Thus, the speed of the index and output of the software can be increased with decreased image or photograph acquisition time without swapping out parts of the apparatus.

As shown, the inspection station 200 may be outfitted with a rejection system. The can rejection system includes an ejector positioned between the index path and the manufacturing queue 22 for culling an individual container body 14 having a detected defect from the manufacturing stream of sequentially processed beverage containers prior to transferring the container body to a subsequent process. The ejector may be a mechanical spring-loaded kick-out, a mechanical arm, pendulum, plunger, piston, plate, or grasping apparatus, or other mechanical system, but is preferably a blow-off nozzle, such as an air knife 252, including a source of fluid pressure in which activation of same is either manually controlled or, more preferably controlled by a signal originating from a software routine stored in the memory on the computer 400 which compares the results of the camera inspection to a quality standard preset by the manufacturer. If, upon comparison of the inspected container body 14 to the quality standard, the container body 14 is deemed to fail the quality standard, the fluid pressure is activated and delivered through the blow-off nozzle to the container body 14 which thrusts the container body 14 from the indexer to a reject chute and into a waste area, such as waste bin.

The ejector is located between the index path of the inspection station 200 and the manufacturing queue 22. That is, the ejector is capable of removing a defective container body 14 prior to subsequent steps in the manufacturing process 100. Accordingly, the ejector is located along the circumference of the indexer after the imager but before the transfer wheel or other discharge mechanism.

In one embodiment, an electro-mechanical inspection station 200 comprises a computer 400 having a memory which stores an executable software comprising a first routine controlling mandrel rotation, a second routine controlling movement of the container bodies on the indexer, a third routine controlling the camera 240, a fourth routine comparing beverage container images against a preset quality standard, and a fifth routine for activating removal of a defective container body from the manufacturing queue 22.

And, because this invention is auto feed into and out of the inspection station 200, inspected container bodies are not destroyed or contaminated by human interaction. Currently most inspection of container bodies is performed manually, so container bodies are discarded if they are touched by a human.

The present invention increases product reliability. It directly leads to production of fewer non-conforming container bodies because defects are identified sooner and quicker, as is the source of the defects.

As used herein, the terms "first," "second," "third," etc. are for illustrative purposes only and are not intended to limit the embodiments in any way. Additionally, the term "plurality" as used herein is intended to indicate any number greater than one, either disjunctively or conjunctively as necessary, up to an infinite number. The terms "joined," "attached," and/or "connected" as used herein are intended to put or bring two elements together so as to form a unit, and any number of elements, devices, fasteners, etc. may be provided between the joined, attached or connected elements unless otherwise specified by the use of the term "directly" and/or supported by the drawings. The phrase "sequentially aligned" is intended to indicate a manufacturing arrangement wherein items of manufacture can be transferred sequentially between manufacturing stations, and any number of manufacturing stations can be sequentially aligned without regard to the order of the manufacturing steps or processes carried out at each manufacturing station. As used herein, the term "computer" is intended to include a programmable interface.

While the specific embodiments have been illustrated and described, numerous modifications come to mind without significantly departing from the spirit of the invention, and the scope of protection is only limited by the scope of the accompanying Claims.

What is claimed is:

1. A metallic beverage container body inspection apparatus comprising:
    an index path wherein a fraction of a plurality of metallic beverage container bodies in manufacturing queue is diverted from the manufacturing queue to the index path;

an indexer which sequentially transfers metallic beverage container bodies from the manufacturing queue of the metallic beverage container bodies, the indexer having a plurality of container body pockets which maintain the metallic beverage container bodies in a predetermined orientation;

a dwell position in operative alignment with the index path wherein the indexer delivers metallic beverage container bodies to the dwell position;

an inspection position vertically aligned with and horizontally offset from the dwell position and the index path;

an image recorder aimed the inspection position for capturing a plurality of images about a circumference of each of the fraction of metallic beverage containers as each of the fraction of metallic beverage containers completes at least one full rotation.

2. The apparatus of claim 1 further comprising:
a mandrel having a generally cylindrical side wall separating a distal end of the mandrel from a proximal end of the mandrel wherein the mandrel is insertable within the metallic beverage container bodies such that the distal end is positioned adjacent an enclosed bottom of the metallic beverage containers and the proximal end is positioned adjacent an open end of the metallic beverage container bodies.

3. The apparatus of claim 2 wherein the mandrel is rotationally driven about a central axis of the mandrel.

4. The apparatus of claim 3 wherein the central axis of the mandrel is aligned with the dwell position wherein an open end of a metallic beverage container can be transferred over and about the mandrel.

5. The apparatus of claim 4 further comprising:
a source of a fluid pressure associated with the dwell position wherein a force provided by the source of the fluid pressure provides a movement by a metallic beverage can body from the indexer at the dwell position onto the mandrel the inspection position.

6. The apparatus of claim 1 further comprising:
a computer having a software routine store on a non-transitory computer usable memory wherein the software routine controls a movement of the indexer.

7. The apparatus of claim 1 further comprising:
a computer having a software routine stored on a non-transitory computer usable memory wherein the software routine compares an image recorded by the image recorder to a standard stored in the memory to make a determination whether a decoration on a metallic beverage can body is within the standard.

8. The apparatus of claim 1 further comprising:
a communication link between the inspection apparatus and a metallic beverage container body decorating apparatus.

9. The apparatus of claim 8 further comprising:
a computer having a software routine stored on a non-transitory computer usable memory wherein the software routine compares an image recorded by the image recorder to a standard stored in the non-transitory computer usable memory to make a determination whether a decoration on a metallic beverage can body is within the standard, wherein a signal is sent via the communication link to the metallic beverage container body decorating apparatus in response to an output of the software routine.

10. The apparatus of claim 1 further comprising:
a pair of pads separated by a space for accommodating the metallic beverage container body therebetween wherein the metallic beverage container body is supported between the pads wherein an open end of the metallic beverage container body is supported against a first pad and a closed end of the metallic beverage container body is supported by a second pad.

11. The apparatus of claim 1 further comprising:
an ejector positioned between the index path and the manufacturing queue for culling a metallic beverage container body having a detected defect prior to transferring the metallic beverage container body having a detected defect to a subsequent process, wherein the ejector is controlled by a signal originating from a software routine stored in a non-transitory computer usable memory on a computer.

12. A metallic beverage container body inspection apparatus comprising:
an index path along which a plurality of metallic beverage container bodies are sequentially transferred;

an indexer which sequentially transfers the metallic beverage container bodies along the index path in a predetermined orientation;

a dwell position in operative alignment with the index path wherein the indexer delivers metallic beverage container bodies to the dwell position;

an inspection position vertically aligned with and horizontally offset from the dwell position and the index path;

a mandrel having a generally cylindrical side wall separating a distal end of the mandrel from a proximal end of the mandrel wherein the mandrel is insertable within the metallic beverage container bodies such that the distal end is positioned adjacent an enclosed bottom of the metallic beverage containers and the proximal end is positioned adjacent an open end of the metallic beverage container bodies;

an inspection position coincident with the mandrel;

an image recorder aimed the inspection position for capturing a plurality of images about a circumference of each of the plurality of metallic beverage containers as each of the plurality of metallic beverage containers completes at least one full rotation about a generally horizontal axis of the mandrel.

13. A method of inspecting a metallic beverage container body having decorations applied thereon by a dry offset rotary beverage container body decorator comprising the steps of:
providing an inspection station subsequent to a decorating operation and prior to a necking and flanging operation;

processing a manufacturing queue comprising a plurality of metallic beverage container bodies through the decorating apparatus wherein decoration is applied to each metallic container body;

diverting a fraction of the plurality of metallic beverage containers in the manufacturing queue to the inspection station subsequent to the processing step;

sequentially feeding each of the fraction of the plurality of metallic beverage container bodies to an indexer on the inspection station;

indexing each of the fraction of the plurality of metallic beverage containers along an index path to a dwell position;

recording images of each of the fraction of the plurality of metallic beverage containers; and transferring each of the fraction of the plurality of metallic beverage containers from the dwell position to an inspection position vertically aligned with and horizontally offset from the dwell position and the index path wherein a rotational cylindrical mandrel is associated with the inspection position and each of the fraction of the plurality of metallic beverage containers is loaded one at a time onto the mandrel and rotated with the mandrel as the recording images step is performed.

14. The method of claim 13 further comprising the step of: providing a force from a source of fluid pressure which transfers a metallic beverage container body from the dwell position onto the mandrel at the inspection position during the transferring step.

15. The method of claim 14 further comprising the step of: providing a computer having a software routine stored on a non-transitory computer usable memory wherein the software routine compares an image recorded by the image recorder to a standard stored in the non-transitory computer usable memory to make a determination whether a decoration on a metallic beverage container body is within the standard.

16. The method of claim 14 further comprising the step of: providing a computer having a software routine stored on a non-transitory computer usable memory wherein the software routine compares the recorded images to a standard stored in the non-transitory computer usable memory to make a determination whether a decoration on a metallic beverage can body is within the standard, wherein a signal is sent via a communication link between the inspection station and a dry offset rotary metallic beverage container body decorating apparatus in response to an output of the software routine.

17. The method of claim 16 further comprising the step of: automatically making a change in the operation of the dry offset rotary metallic beverage container body decorating apparatus in response to the signal.

18. The method of claim 17 further comprising the step of: tracking an identity or position of at least one of the fraction of the plurality of metallic beverage container bodies in the manufacturing queue.

19. The method of claim 18 further comprising the step of: associating the identity or position of the at least one of the fraction of the plurality of metallic beverage with a particular transfer blanket on a dry offset rotary metallic beverage container body decorating apparatus.

* * * * *